US012715692B2

(12) United States Patent
Austrheim

(10) Patent No.: US 12,715,692 B2
(45) Date of Patent: Aug. 25, 2026

(54) DUAL CARRIAGE ACCESS STATION FOR AN AUTOMATED STORAGE AND RETRIEVAL SYSTEM AND A METHOD FOR USING SAME

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 268 days.

(21) Appl. No.: 18/256,320

(22) PCT Filed: Nov. 29, 2021

(86) PCT No.: PCT/EP2021/083282
§ 371 (c)(1),
(2) Date: Jun. 7, 2023

(87) PCT Pub. No.: WO2022/122434
PCT Pub. Date: Jun. 16, 2022

(65) Prior Publication Data

US 2024/0034559 A1 Feb. 1, 2024

(30) Foreign Application Priority Data

Dec. 11, 2020 (NO) .................................... 20201366

(51) Int. Cl.
*B65G 1/06* (2006.01)
*B60P 1/00* (2006.01)
(Continued)

(52) U.S. Cl.
CPC .............. *B65G 1/065* (2013.01); *B60P 1/006* (2013.01); *B60P 1/12* (2013.01); *B60P 1/52* (2013.01);
(Continued)

(58) Field of Classification Search
CPC .... B60P 1/006; B60P 1/04; B60P 1/06; B60P 1/12; B60P 1/365; B60P 1/52;
(Continued)

(56) References Cited

U.S. PATENT DOCUMENTS 6,379,097 B1 * 4/2002 Vondenhuevel ....... B65G 65/23 414/421
9,020,632 B2 * 4/2015 Naylor ................. B65G 1/0492 414/277
(Continued)

FOREIGN PATENT DOCUMENTS

CN 202967269 U 6/2013
CN 109987366 A 7/2019
(Continued)

OTHER PUBLICATIONS

International Search Report issued in corresponding International Application No. PCT/EP2021/083282, mailed on Feb. 28, 2022 (5 pages).
(Continued)

*Primary Examiner* — James Keenan
(74) *Attorney, Agent, or Firm* — Baker Botts L.L.P.

(57) ABSTRACT

An access station, which is for presentation of a storage container from an automated storage and retrieval system to a picker, has a receiving area for receiving storage containers, forward of the receiving area a picking position for picking products from the storage container. The access station includes a guiding frame, a primary carriage, and a secondary carriage. The guiding frame is arranged in a horizontal plane and extends between the picking position and the receiving area. The primary carriage, which is for transporting a storage container, includes a primary carriage base, a primary carriage displacement motor, a first storage container support, and a transfer device. The primary carriage base is movable along the guiding frame. The primary
(Continued)

carriage displacement motor is configured to move the primary carriage along the guiding frame. The first storage container support is connected to the primary carriage base. The transfer device is for displacement of a storage container positioned on the first storage container support. The secondary carriage, which is for transporting a storage container, includes a secondary carriage base, a secondary carriage displacement motor, and a second storage container support. The secondary carriage base is movable along the guiding frame. The secondary carriage displacement motor is configured to move the secondary carriage along the guiding frame. The second storage container support is connected to the secondary carriage base. The secondary carriage is configured to receive a storage container being displaced from the primary carriage by the transfer device.

26 Claims, 17 Drawing Sheets

(51) Int. Cl.

| | |
|---|---|
| ***B60P 1/12*** | (2006.01) |
| ***B60P 1/52*** | (2006.01) |
| ***B65G 1/04*** | (2006.01) |
| ***B65G 1/137*** | (2006.01) |

(52) U.S. Cl.
CPC ......... *B65G 1/0471* (2013.01); *B65G 1/0485* (2013.01); *B65G 1/1378* (2013.01)

(58) Field of Classification Search
CPC .... B65G 1/0471; B65G 1/0485; B65G 1/065; B65G 1/1378
See application file for complete search history.

(56) References Cited

U.S. PATENT DOCUMENTS

| | | | | |
|---|---|---|---|---|
| 10,894,664 | B1 * | 1/2021 | Brady | B65G 1/1378 |
| 11,390,461 | B2 * | 7/2022 | Heggebø | B65G 1/065 |
| 12,012,280 | B2 * | 6/2024 | Austrheim | B65G 1/0492 |
| 12,351,092 | B2 * | 7/2025 | Futch | B60P 1/04 |
| 12,545,511 | B2 * | 2/2026 | Austrheim | B65G 1/0464 |
| 2003/0185656 | A1 | 10/2003 | Hansl | |

FOREIGN PATENT DOCUMENTS

| | | | | |
|---|---|---|---|---|
| CN | 111284992 | A | 6/2020 | |
| CN | 111392302 | A | 7/2020 | |
| JP | H0366905 | U | 6/1991 | |
| JP | 2004075269 | A | 3/2004 | |
| JP | 2012051697 | A | 3/2012 | |
| NO | 317366 | B1 | 10/2004 | |
| NO | 344742 | B1 | 3/2020 | |
| WO | 92/18399 | A1 | 10/1992 | |
| WO | 2012/083060 | A1 | 6/2012 | |
| WO | 2014/075937 | A1 | 5/2014 | |
| WO | 2014/090684 | A1 | 6/2014 | |
| WO | 2015/193278 | A1 | 12/2015 | |
| WO | 2017/211640 | A1 | 12/2017 | |
| WO | 2018/146304 | A1 | 8/2018 | |
| WO | 2018/233886 | A1 | 12/2018 | |
| WO | WO-2019086237 | A1 * | 5/2019 | B65G 1/065 |
| WO | WO-2019206672 | A2 * | 10/2019 | B65G 1/065 |
| WO | 2019/238664 | A1 | 12/2019 | |
| WO | 2020/074717 | A1 | 4/2020 | |

OTHER PUBLICATIONS

Written Opinion issued in corresponding International Application No. PCT/EP2021/083282, mailed on Feb. 28, 2022 (10 pages).
Search Report issued in counterpart Norwegian Patent Application No. 20201366 mailed on Jul. 6, 2021 (2 pages).
Le Huy Anh, Notice for Vietnamese Patent Application No. 1-2023-04112, dated Mar. 28, 2025, 3 pages, pub. by The Intellectual Property Office of Vietnam, Hanoi, Vietnam.
Agnes Wittmann-Regis, International Preliminary Report on Patentability, PCT international application PCT/EP2021/083282, dated Jun. 13, 2023, 8 pages, pub. by The International Bureau of WIPO, Geneva, Switzerland.
Tachibana, Akira, Office Action in JP2023535401, mailed Nov. 21, 2025, 8 pages, Japan Patent Office, Tokyo, Japan.
Thenert, Alexander, Office Action in EP21820569.8, mailed Jul. 23, 2025, 5 pages, European Patent Office, Rijswijk, Netherlands.
Zhang, Yuxiang, Office Action in CN202180093541.1, mailed Jun. 28, 2025, 23 pages, The State Intellectual Property Office of the People's Republic of China, Beijing, China.
Rognan, Tove Kathrine, Office Action in No. 20201366, mailed Feb. 14, 2026, 13 pages, Norwegian Industrial Property Office, Oslo, Norway.
Anonymous, Office Action in KR1020237022921, mailed May 30, 2026, 9 pages, Korean Intellectual Property Office, Daejeon, Korea.

* cited by examiner

DUAL CARRIAGE ACCESS STATION FOR AN AUTOMATED STORAGE AND RETRIEVAL SYSTEM AND A METHOD FOR USING SAME

FIELD OF THE INVENTION

The present invention relates to an automated storage and retrieval system for storage and retrieval of containers, in particular to an access station for presentation of a storage container from an automated storage and retrieval system to a picker.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201*a*,301*a*, and first and second sets of wheels 201*b*,301*b*,201*c*,301*c* which enable the lateral movement of the container handling vehicles 201,301 in the X direction and in the Y direction, respectively. In FIGS. 2 and 3 two wheels in each set are fully visible. The first set of wheels 201*b*,301*b* is arranged to engage with two adjacent rails of the first set 110 of rails, and the second set of wheels 201*c*,301*c* is arranged to engage with two adjacent rails of the second set 111 of rails. At least one of the sets of wheels 201*b*,301*b*,201*c*,301*c* can be lifted and lowered, so that the first set of wheels 201*b*,301*b* and/or the second set of wheels 201*c*,301*c* can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201*a* in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201*a* as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106. The storage container 106 illustrated in FIG. 4 has a height Hf, a width Wf and a length Lf. The storage container 106 has a horizontal cross section Af.

An access station for picking storage containers is disclosed in WO2020/074717. This access station comprises an entry conveyor and an exit conveyor. The access station therefore has a footprint exceeding the width/length of a storage column. There will therefore be some distance between the picking zone of two adjacent access stations.

The access station disclosed in WO2020/074717 also has many moving or rotating components, particularly associated with the conveyors, that are prone to wear and regularly require maintenance.

An objective of the present invention is therefore to provide a more compact access station where picking zones of two adjacent access stations can be arranged closer to each other.

A further objective of the present invention is to reduce the complexity of the access station, particularly regarding the number of moving components.

SUMMARY OF THE INVENTION

The present invention is set forth and characterized in the independent claims, while the dependent claims describe other characteristics of the invention.

The present invention relates to a an access station for presentation of a storage container from an automated storage and retrieval system to a picker, the access station having a receiving area for receiving storage containers, forward of the receiving area a picking position for picking products from the storage container, wherein the access station comprises:

a guiding frame arranged in a horizontal plane and extending between the picking position and the receiving area;

a primary carriage for transporting a storage container, wherein the primary carriage comprises:

a primary carriage base movable along the guiding frame;

a primary carriage displacement motor configured to move the primary carriage along the guiding frame;

a first storage container support connected to the primary carriage base; and a transfer device for displacement of a storage container positioned on the first storage container support;

a secondary carriage for transporting a storage container, wherein the secondary carriage comprises:

a secondary carriage base movable along the guiding frame;

a secondary carriage displacement motor configured to move the secondary carriage along the guiding frame; and a second storage container support connected to the secondary carriage base;

wherein the secondary carriage is configured to receive a storage container being displaced from the primary carriage by means of the transfer device. An advantage of the present access station is that it can increase the frequency of storage containers being presented to the picker. The throughput of storage containers in the storage and retrieval system can thus be increased.

Between each storage container presented to the picker, the primary carriage does not need to travel beyond the receiving area where it receives the next storage container to be presented to the picker, i.e. the travelled distance is kept at a minimum. By keeping the travel as short as possible for the primary carriage, time can be saved. This can be achieved by the transfer device moving the storage container from the first storage container support to the second storage container support. Then the primary carriage does not need to travel to an intermediate position to deliver the storage container already presented before it can receive the subsequent storage container.

The transfer device may transfer the storage container from the first storage container support to the second storage container support when the primary carriage and the secondary carriage stand still or while the primary carriage and the secondary carriage are moving together.

The transfer device may e.g. be arranged on the carriage base. Alternatively, the transfer device may be arranged on the first storage container support.

By transferring the storage container from the first storage container support to the second storage container support while the primary carriage and the secondary carriage are moving together, the primary carriage can be ready to receive the subsequent storage container when it reaches the receiving area. In this way time can be saved. In particular if the container handling vehicle stands by ready to deliver the subsequent storage container.

In one aspect, the receiving area may comprise only one receiving position.

By having a receiving area comprising only one receiving position, a compact access station can be achieved. This may give room for a greater number of storage containers to be stored in the system.

The receiving area may define a larger area than the sum of receiving positions comprised by that receiving area. Particularly when the receiving area only comprises one receiving position. A part of the receiving area may e.g. be arranged below one or several storage column(s).

In one aspect, the receiving area may comprise a plurality of receiving positions.

By having a receiving area comprising a plurality of receiving positions, the traffic on the rail system can be better organized. Container handling vehicles can queue at different receiving positions simultaneously.

The receiving area may comprise two or more receiving positions, preferably three or four receiving positions.

The plurality of receiving positions may be spaced apart. However, the access station will be more compact the closer together the receiving positions are arranged.

Each receiving position is positioned in vertical alignment with a port column, i.e. an access opening, of the automated storage and retrieval system.

Alternatively, the access station may comprise a framework structure with upright members and a rail system. In such a case the framework structure of the access station should made to connect with the framework structure of the automated storage and retrieval system, e.g., regarding the height and arrangement of the rail systems.

An access station having a receiving area comprising a plurality of receiving positions will be used in combination with an automated storage and retrieval system having a framework structure comprising a plurality of port columns. The arrangement of the receiving positions then corresponds to the arrangement of the port columns.

By adapting the width of the receiving position to the width of one port column, two or more receiving positions can be arranged side-by-side in a space efficient manner, i.e. not spaced apart. Such arrangement of the receiving positions may provide a compact access station. The width of a port column may be seen as the width of a storage container with an additional width of a rail of the rail system (half a rail width arranged on each side of the storage container), and thus when a receiving position corresponds to a width of a port column, receiving positions can be arranged in a side-by-side relationship corresponding to the positions of the port columns and allowing the receiving positions to be provided in adjacent rows of storage columns.

With an access station comprising a plurality of receiving positions, a first container handling vehicle can deliver/retrieve a storage container from a first receiving position while a second container handling vehicle is preparing to deliver/retrieve a storage container from a second receiving position. Thus, a container handling vehicle can always stand by ready to deliver/retrieve a storage container from the primary carriage or the secondary carriage. An advantage of this is that the primary carriage does not have to wait for the container handling vehicles to switch places; hence, no time is wasted for the primary carriage.

It is possible for container handling vehicles facing in opposite directions to deliver storage containers to the same receiving position.

The first receiving position will typically be closer to the picking position than the second receiving position. The first receiving position, being closest to the picking position, is preferably the default receiving position. Using the receiving position closest to the picking position, i.e. the first picking position, is preferred because it will require the shortest movement of the primary carriage and thus be the fastest, minimising the use time of the storage and retrieval system resource that is the access station. However, if a container handling vehicle is not readily available at the first receiving position, it can be beneficial to utilize other receiving positions where a container handling vehicle is available even though the primary carriage must then move a longer distance. If the first receiving position is occupied by a first container handling vehicle, any subsequent container handling vehicle(s) may use any one of the other port columns.

To achieve efficient utilization of the container handling vehicles, the container handling vehicle delivering a subsequent storage container to the primary carriage may typically also retrieve the preceding storage container from the secondary carriage.

Cantilever container handling vehicles may be used for delivering and retrieving storage containers to/from the receiving area. Such container handling vehicles typically cover two access openings. If the cantilever container handling vehicle has an orientation such that it covers the access openings above the first and second receiving positions, another container handling vehicle will typically utilize the third receiving position in the event of simultaneous operations.

A single cell container handling vehicle may be used in place of or in addition to cantilever container handling vehicles for delivering and retrieving storage containers to/from the receiving area. Such container handling vehicles typically cover only one access opening. In the event of simultaneous operations of single cell container handling vehicles, all receiving positions can be utilized.

The container handling vehicle may also have a different form which may cover over other numbers or portions of the access openings.

In one aspect, the primary carriage and the secondary carriage may be configured to move independently of each other.

In one aspect, the primary carriage and the secondary carriage may be configured to move in a reciprocating manner.

By providing the primary carriage and the secondary carriage with a displacement motor each, they can move along the guiding frame independently of each other.

One of the primary carriage and the secondary carriage may move along the guiding frame while the other one of the primary carriage and the secondary carriage may remain stationary. Furthermore, the primary carriage and the secondary carriage may move along the guiding frame simultaneously, either towards each other or away from each other.

In this way the primary carriage may move from the receiving area towards the picking position independently of the secondary carriage. While the primary carriage brings the subsequent storage container from the receiving area towards the picking position, the secondary carriage may bring the storage container already picked from towards the receiving position previously occupied by the primary carriage. Then the container handling vehicle already in position with the lifting device lowered towards the access station can retrieve the storage container supported by the secondary carriage. Alternatively, the secondary carriage can move towards another receiving position in the receiving area, even simultaneous with the primary carriage receiving the subsequent storage container. Then a second container handling vehicle will typically retrieve the storage container from the secondary carriage.

In this way the secondary carriage can move towards and engage the primary carriage while the primary carriage is located in the picking position. The transfer of the storage container from the first storage container support to the second storage container support may then start immediately after picking from that storage container has been performed.

The primary carriage displacement motor and secondary carriage displacement motor can be similar or even identical motors. The displacement motors may be arranged on the primary carriage base and secondary carriage base, preferably at least partly inside a volume defined by the respective carriage bases. Alternatively, the displacement motors may be arranged on the guiding frame. Any motor having an appropriate size can be used; e.g., an electric motor such as a brushless DC motor.

The displacement motors and any other motors arranged on the primary carriage and/or the secondary carriage may be powered by batteries arranged on the respective carriage bases. Alternatively, the motors may be connected to one or several external power sources.

The displacement motors may be connected to at least one of the respective wheels of the primary carriage and the secondary carriage by gears or belt drives. Alternatively, the displacement motors may be direct drive mechanisms.

For stability purposes, the displacement motors may be arranged centrally in the carriage bases, preferably as low as possible.

The primary carriage displacement motor and secondary carriage displacement motor are preferably in direct or indirect communication with a control system, such that collisions between the primary carriage and the secondary carriage are avoided.

The access station may preferably be configured for signal communication with a control system.

The access station may be configured to handle storage containers and/or consolidation bins.

By adapting the width of the access station to the width of one storage column, two or more access stations can be arranged side-by-side in a space efficient manner, i.e. not spaced apart. Such arrangement of the access stations may enable the human picker to be more efficient due to shorter distances between the access stations. The width of a storage column may be seen as the width of a storage container with an additional width of a rail of the rail system (half a rail width arranged on each side of the storage container), and thus when an access station corresponds to a width of a storage column, access stations can be arranged in a side-by-side relationship corresponding to the positions of the storage columns and allowing the access stations to be provided in adjacent rows of storage columns.

In one aspect, the transfer device may comprise a conveyor.

In one aspect, the conveyor may comprise motorized rollers. Such rollers may be arranged on the first storage container support and be configured to support the storage container prior to transfer. Furthermore, the conveyor may comprise a belt.

In one aspect, the conveyor may comprise:

a rail projecting aft from the primary carriage in a direction towards the secondary carriage, the rail having a length exceeding the length or width of the storage container;

a slider connected to the rail and configured for interaction with a storage container; and a transfer motor configured to move the slider relative to the first storage container support in the direction towards the secondary carriage, to provide a thrust on a storage container positioned on the first storage container support.

The primary carriage is arranged forward of the secondary carriage. Hence, the secondary carriage is arranged aft/rearward of the primary carriage. A transfer of a storage container from the primary carriage to the secondary carriage will thus usually be in the aft/rearwards direction. A transfer of a storage container from the secondary carriage to the primary carriage will thus usually be in the forwards direction.

The rail may preferably extend inside a perimeter of the secondary carriage base when the primary carriage and the secondary carriage are connected to each other or at least moved close together.

The rail may be arranged in a central part of the primary carriage base and have a longitudinal axis parallel to the direction of movement of the primary carriage.

The rail is preferably arranged below a level of the first storage container support. Furthermore, the rail may be arranged in a gap in the first storage container support.

The rail may be telescopic.

The rail may comprise a belt and two belt wheels typically arranged at respective ends. Wherein the belt may be configured to be operated by the transfer motor either directly or indirectly via a second belt. The belt may further be connected to the slider such that the slider is operated by the transfer motor. The transfer motor will in turn typically be communicating with a control system. The belt could be in the form of a chain.

The rail may alternatively be a linear actuator. A less preferred alternative is a double acting hydraulic cylinder.

The slider is connected to the rail, i.e. directly connected to the rail or indirectly connected to the rail via at least one intermediate component. The slider may be releasably connected to the rail.

The slider may be configured to move in a reciprocating manner along the rail. Alternatively, a set of sliders could move in a first direction along a first side of the rail, then when reaching the end of the rail turn to the opposite second side of the rail and move in a second direction along the second side of the rail, wherein the second direction is opposite the first direction. The first slider would then typically turn from the first side of the rail to the second side of the rail as the second slider turns from the second side of the rail to the first side of the rail.

If the slider is fixed to the rail, the transfer motor may be configured to move the slider by means of providing a reciprocating motion of the rail.

The slider may have an initial position allowing at least half the length or width of a storage container to be supported on the first storage container support while the storage container is positioned between the slider and the secondary carriage.

The slider may have a subsequent position allowing less than half the length or width of a storage container to be supported on the first storage container support while the storage container is positioned between the slider and the secondary carriage.

The slider may have a vertically extending portion at least partly arranged at the same vertical elevation as a storage container being supported on the first storage container support.

The transfer motor is preferably electrically powered.

If the transfer device comprises a double acting hydraulic cylinder, the transfer motor may be a hydraulic pump supplying hydraulic pressure to the cylinder.

In one aspect, the access station may further comprise:

a latch for releasably connecting the primary carriage to the secondary carriage.

By attaching the primary carriage to the secondary carriage, the risk of dropping a storage container during its displacement from the first storage container support to the second storage container support is reduced. Particularly when the storage container displacement takes place during movement of the primary carriage and the secondary carriage.

The latch may preferably be configured such that the primary carriage and the secondary carriage can be located in respective adjacent receiving positions while being connected. In this way storage containers can be received/retrieved from the first storage container support and the second storage container support simultaneously.

In one aspect, the latch may comprise:

a first coupling part arranged at a rear end of the primary carriage base; and a second coupling part arranged at a front end of the secondary carriage base;

wherein the rear end of the primary carriage is facing the front end of the secondary carriage.

The latch may be a snap lock system, e.g. wherein the first coupling part is a profile comprising a retention lip and the second coupling part is a resilient or biased barb. The latch should then preferably comprise a lever or pulling/pushing device for disengagement of the second coupling part and the first coupling part.

The latch in the form of a snap lock system may comprise a sensor for connection detection. The sensor may detect a connection by means of movement of the barb. The sensor may be in signal communication with the control system, either directly or indirectly via the access station or any of its components.

In one aspect, the first storage container support and the second storage container support may comprise rollers, sliding surface, a continuous track or any combinations thereof.

The first storage container support and the second storage container support may preferably have perimeters substantially equal in footprint compared to the footprint of the storage container. In this way the first storage container support and the second storage container support may provide a stable support for the storage container, particularly in cases when the weight of the product or products in the storage container is/are not evenly distributed.

The first storage container support and the second storage container support may comprise vertical side panels arranged parallel to their direction of travel, which typically also is the direction of storage container transfer between the two carriages. The vertical side panels may prevent unintentional movement of storage containers. This is particularly advantageous during transfer of the storage container from the primary carriage to the secondary carriage.

The vertical side panels may be provided with rollers or sliding surfaces to reduce friction if the storage container comes in contact with the vertical side panel during transfer.

If the vertical side panels are provided with rollers, the rollers may be powered and configured to displace the storage container across the first storage container support.

A sliding surface may be made of a different material than the vertical side panels, preferably with a lower friction. Suitable materials may be polymers, such as polyoxymethylene (POM). The sliding surface may be plate attached to the vertical side panel or a coating applied the vertical side panel.

The first storage container support and the second storage container support may comprise end stops arranged orthogonal to their direction of travel, which typically also is the direction of storage container transfer between the two carriages. The end stops may be arranged in the end of the first storage container support facing away from the secondary carriage, and in the end of the second storage container support facing away from the primary carriage. The end stops may prevent unintentional movement of storage containers. This is particularly advantageous during transfer of the storage container from the primary carriage to the secondary carriage.

The end stops may be formed from the same plate as the vertical side panels.

In one aspect, the guide frame may comprise a first guide path; and wherein both the primary carriage and the secondary carriage are configured for movement along the first guide path.

A guiding frame with only one guide path will make the guiding frame less complex.

However, the guiding frame may comprise two guide paths, a first guide path and a second guide path. The primary carriage may be configured for movement along the first guide path and the secondary carriage may be configured for movement along the second guide path. The second guide path will then typically have a different vertical elevation than the first guide path. The first storage container support and the second storage container support can still be configured to have the same vertical elevation.

In one aspect, the primary carriage may further comprise:

at least two sets of wheels connected to either side of the primary carriage base; and the secondary carriage may further comprise:

at least two sets of wheels connected to either side of the secondary carriage base.

The aft set of wheels of the secondary carriage may be projecting aft from the secondary carriage or at least the second storage container support. This wheel arrangement may provide improved stability to the secondary carriage during transfer of the storage container.

At least one of the wheelsets, i.e. sets of wheels, may be affixed to a straight axle, such that both wheels rotate in unison. This is preferred for the wheelsets connected to the primary carriage displacement motor or the secondary carriage displacement motor.

In one aspect, the primary carriage displacement motor may be arranged on the primary carriage base and configured to turn at least one of the wheels connected to the primary carriage base; and the secondary carriage displacement motor may be arranged on the secondary carriage base and configured to turn at least one of the wheels connected to the secondary carriage base.

In one aspect, the primary carriage may further comprise:

a primary drive belt arranged on the guiding frame, the primary drive belt extending at least from the picking position to the receiving area and being connected to the primary carriage base;

wherein the primary carriage displacement motor is arranged on the guiding frame and configured to operate the primary drive belt to move the primary carriage along the guiding frame; and the secondary carriage may further comprise:

a secondary drive belt arranged on the guiding frame, the secondary drive belt extending at least from the picking position to the receiving area and being connected to the secondary carriage base;

wherein the secondary carriage displacement motor is arranged on the guiding frame and configured to operate the secondary drive belt to move the secondary carriage along the guiding frame.

An advantage of the primary carriage displacement motor and the secondary carriage displacement motor being arranged on the guiding frame is that less components are arranged on the primary carriage base and the secondary carriage base, such that their weight and complexity can be reduced.

The primary drive belt and the secondary drive belt may be arranged in parallel with the same vertical elevation either side-by-side or spaced apart.

Each of the primary drive belt and the secondary drive belt may be arranged on two belt wheels arranged at opposite ends of the guiding frame.

Alternatively, the primary drive belt and the secondary drive belt may be chains.

In one, aspect, the secondary carriage may be configured to carry two or more storage containers. By configuring the secondary carriage to support two or more storage containers, the secondary carriage may be able to buffer storage containers in periods of reduced availability of container handling vehicles. In periods with increased availability of container handling vehicles, two or more container handling vehicles may substantially simultaneously each retrieve a storage container from the secondary carriage.

In one aspect, the first storage container support may be pivotably connected to the primary carriage base by a pivotal connection;

and the access station may further comprise:

a tilting device for tilting of the first storage container support; and the primary carriage may have a receiving state in which the first storage container support is arranged substantially parallel to the horizontal plane, and a picking state in which the first storage container support is tilted relative to the horizontal plane with a predetermined tilting angle $\alpha$.

The primary carriage is in the receiving state when the first storage container support receives a storage container and when a storage container is retrieved from the first storage container support, typically by means of a container handling vehicle.

The primary carriage is in the receiving state when a storage container is transferred from the first storage container support to the second storage container support.

The primary carriage is typically moved into the picking state when located in the picking position to provide an ergonomic working position for the picker.

The second storage container support preferably has the same vertical elevation as the first storage container support in the receiving state.

In one aspect, the tilting device may comprise:

a tilting motor arranged on the primary carriage base for providing rotational drive;

a drive crank coupled to the tilting motor to transmit torque from the tilting motor; and a coupler link pivotally coupled to the drive crank at a first end, and pivotally coupled to the first storage container support at an opposite second end, wherein the coupler link, in response to operation of the tilting motor, is configured to provide a thrust to an underside of the first storage container support, such that the first storage container is tilted relative to the horizontal plane $P_H$.

In one aspect, the tilting device may comprise:

a ramp at least partly arranged below the guiding frame;

a follower connected to and extending from the first storage container support for interaction with the ramp;

wherein the primary carriage has a receiving state in which the first storage container support is arranged substantially parallel to the horizontal plane $P_H$, and a picking state in which the first storage container support is tilted relative to the horizontal plane $P_H$ with a predetermined tilting angle $\alpha$; and wherein the follower and the ramp are configured to interact to move the primary carriage into the picking state in response to a movement of the primary carriage from the receiving area to the picking position.

The first storage container support may comprise a plate with a top surface for positioning of a storage container and an opposite under surface for arrangement of the follower. The follower may preferably extend longitudinally substantially orthogonal to the under surface of the first storage container support.

The follower may be configured to follow a surface of the ramp. As the vertical elevation of the ramp change, the follower may provide trust to the underside of the first container support, such that the first storage container is tilted relative to the horizontal plane $P_H$.

The follower may comprise a distal end provided with a follower wheel.

Alternatively, the distal end may be provided with a roller, a ball or a sliding surface.

The follower may extend through the primary carriage base at least in the receiving state.

The follower may preferably also extend through the primary carriage base in the picking state.

The ramp may be a fixed bracket.

The interaction between the follower and the ramp may be direct or indirect, e.g. via an intermediate component.

The ramp may have a first portion at least partly arranged below the guiding frame, wherein the first portion is inclined relative to the horizontal plane $P_H$.

The inclination angle of the first portion will affect the horizontal travel required of the primary carriage to enter the picking state, and thus also the opposite horizontal travel required of the primary carriage to enter the receiving state.

The first portion of the ramp may have a constant incline and thus follow a substantially straight line. The first portion of the ramp may have a gradual incline and thus follow a curve.

The ramp may comprise a second portion at least partly arranged below the picking position, wherein the second portion is inclined differently than the first portion relative to the horizontal plane $P_H$.

The second portion of the ramp may preferably be arranged adjacent the first portion of the ramp.

The second portion may preferably be less inclined than the first portion relative to the horizontal plane $P_H$.

The second portion may be substantially parallel to the horizontal plane $P_H$, i.e. not inclined relative to the horizontal plane $P_H$.

A second portion being substantially horizontal may allow horizontal travel of the primary carriage while maintaining the tilting angle $\alpha$ of the storage container support. The predetermined tilting angle $\alpha$ of the picking state of the primary carriage can thus be entered prior to the primary carriage reaching the picking position. The picker may then quicker recognise the items coming forward.

The second portion of the ramp may have a constant incline and thus follow a substantially straight line. The second portion of the ramp may have a gradual incline and thus follow a curve.

The second portion may be slightly curved to smooth the transition from one type of movement to another.

The predetermined tilting angle $\alpha$ may be adjusted according to the specific needs of a picker, and the height of the access station from the ground.

The tilting angle $\alpha$ may be adjusted with the length of the follower. The tilting angle $\alpha$ may also be adjusted with the vertical elevation of the ramp.

In one aspect, the pivotal connection between the primary carriage base and the first storage container support may have an axis of rotation $C_R$ substantially arranged in the horizontal plane $P_H$, and the coupler link may be connected at a distance from the axis of rotation $C_R$.

The distance between the axis of rotation $C_R$ and the coupler link will affect the maximum tilting angle. Shortening of the distance between the axis of rotation $C_R$ and the coupler link will increase the maximum tilting angle.

The length of the drive crank will also affect the maximum tilting angle. Increasing the length of the drive crank will increase the maximum tilting angle.

The axis of rotation $C_R$ may be arranged close to the front of the primary carriage base.

The coupler link may preferably comprise a recess configured to receive a pivot point of the drive crank, e.g. in the receiving state of the primary carriage.

In one aspect, the pivotal connection between the primary carriage base and the first container support may have an axis of rotation $C_R$ substantially arranged in the horizontal plane $P_H$, and the follower is arranged at a distance from the axis of rotation $C_R$.

The distance between the axis of rotation and the follower will affect the horizontal travel required of the primary carriage to enter the picking state, and thus also the opposite horizontal travel required of the primary carriage to enter the receiving state. Shortening of the distance between the axis of rotation and the follower will reduce the horizontal travel required of the primary carriage to enter the picking state.

The axis of rotation $C_R$ may be arranged close to the front of the primary carriage base, i.e. offset from the centre of gravity of the first container support. This will cause the first container support to return to its receiving state under its own weight.

The axis of rotation $C_R$ may be arranged close to the centre of the primary carriage base, i.e. substantially in the centre of gravity of the first container support. This will cause a seesaw behaviour of the first container support. By moving the axis of rotation closer to the centre of the primary carriage base, less force may be required from the follower in tilting the first storage container support. The follower may be movably connected to the ramp, such that the first storage container support can be forced into the receiving state by the follower in response to a change in the vertical elevation of the ramp while moving the primary carriage in the horizontal direction.

In one aspect, the tilting angle α may be in the range from 2° to 60° relative to the horizontal plane $P_H$.

The tilting angle α range may be from 2° to 60° relative to the horizontal plane $P_H$, more preferably from 3° to 50°, even more preferably from 4° to 45°, even more preferably from 5° to 40°, even more preferably from 6° to 35° even more preferably from 7° to 30°, even more preferably from 8° to 25°, even more preferably from 9° to 20°, for example 15°. The ability to tilt the storage container allows inter alia a human operator to view and/or access the products within the storage container more easily.

A preferred tilting angel α may range from 10° to 20°. Alternatively, this range may have a starting point of 1°, 2°, 3°, 4°, 5°, 6°, 7°, 8°, 9° or 15°. Alternatively, this range may have an end point of 15°, 20°, 25°, 30°, 35°, 40°, 45°, 500 or 60°.

The predetermined tilting angle α may be adjusted according to the specific needs of a picker, and the height of the access station from the ground.

The access station may comprise an access cabinet providing an interface to the picker. The access cabinet may be provided with a hatch granting access to the inside of the access cabinet when a storage container is presented therein. The hatch typically slides open. The access cabinet may then extend a length of approximately two storage columns outside the framework structure. As an alternative to sliding open, the hatch may pivot between open and closed position. The access cabinet may then extend a length of approximately one storage column outside the framework structure. For layout purposes, the access cabinet may extend a length of approximately three storage columns outside the framework structure where appropriate.

The present invention also relates to a primary carriage for an access station as described herein, wherein the primary carriage comprises:

a primary carriage base movable along the guiding frame;

at least two sets of wheels connected to either side of the primary carriage base;

a primary carriage displacement motor configured to move the primary carriage along the guiding frame by means of turning at least one of the wheels;

a first storage container support connected to the primary carriage base; and a transfer device for displacement of a storage container positioned on the first storage container support.

In one aspect, the first storage container support may be pivotably connected to the primary carriage base by a pivotal connection;

wherein the primary carriage further comprises:

a tilting device for tilting of the first storage container support; and wherein the primary carriage has a receiving state in which the first storage container support is arranged substantially parallel to the horizontal plane, and a picking state in which the first storage container support is tilted relative to the horizontal plane with a predetermined tilting angle α.

In one aspect, the primary carriage may further comprise:

a first coupling part releasably connectable to a second coupling part of a secondary carriage.

The present invention also relates to an automated storage and retrieval system comprising:

an access station as described herein;

a rail system comprising a first set of parallel rails arranged in a horizontal plane $P_H$ and extending in a first direction X and a second set of parallel rails arranged in the horizontal plane $P_H$ and extending in a second direction Y which is orthogonal to the first direction X, which first and second sets of rails form a grid pattern in the horizontal plane $P_H$ comprising a plurality of adjacent access opening defined by a pair of neighbouring rails of the first set of rails and a pair of neighbouring rails of the second set of rails;

a plurality of stacks of storage containers arranged in storage columns located beneath a storage section of the rail system, wherein each storage column is located vertically below an access opening;

at least one port column located beneath a delivery section of the rail system and vertically aligned with a receiving position $P_R$ of the access station, the at least one port column being void of storage containers; and a container handling vehicle comprising a lifting device for lifting storage containers stacked in the stacks above the storage section and drive means configured to drive the vehicle along the rail system in at least one of the first direction X and the second direction Y.

In one aspect, the automated storage and retrieval system may comprise:

at least two port columns, preferably three or four port columns.

In one aspect, the automated storage and retrieval system may comprise:

at least two access stations, preferably three or four access stations, arranged side-by-side.

The plurality of access stations arranged side-by-side may present different types of containers. As an example, some of the access stations may present storage containers containing products to be picked. Some of the other access stations may present consolidation bins into which orders are placed. The access stations presenting storage containers will typically have a higher throughput than the access stations presenting consolidation bins.

When several access stations are arranged side-by-side, their accessibility may be improved if their access cabinets extend different lengths from the framework structure. The access cabinets can then partly encircle the picker. Where desired, the access stations may also be at different heights.

The present invention also relates to a method of presenting a storage container at an access station and returning the storage container using an automated storage and retrieval system as described herein, wherein the method comprises the steps of:

placing a first storage container on the first storage container support;

moving the primary carriage to the picking position to present the first storage container to a picker;

moving the primary carriage and the secondary carriage into contact with each other by means of the primary carriage displacement motor and the secondary carriage displacement motor respectively; and transferring the first storage container from the first storage container support to the second storage container support by means of the transfer device.

The first storage container will typically be placed on the first storage container support by means of a container handling vehicle.

In one aspect, if the primary carriage and the secondary carriage are not already in the receiving area $A_R$, the method may further comprise the step of:

moving the primary carriage and the secondary carriage along the guiding frame to the receiving area $A_R$, at least partly while transferring the storage container.

In one aspect, the method may further comprise the steps of:

- moving the primary carriage to a first receiving position;
- placing a second storage container on the first storage container support by means of a first container handling vehicle; and
- moving the primary carriage to the picking position to present the second storage container to the picker.

If the receiving area comprises a plurality of receiving positions, the subsequent storage containers may be received at alternating receiving positions.

The subsequent storage containers may be received from different container vehicles.

In one aspect, the method may further comprise the steps of:

- moving the secondary carriage to the first receiving position;
- retrieving the first storage container from the second storage container support by means of the first container handling vehicle.

The first storage container is preferably retrieved from the second storage container support by the same container handling vehicle placing the second storage container on the first storage container support. The first storage container is therefore also preferably retrieved from the second storage container support at the same receiving position as the second storage container is received by the first storage container support.

In one aspect, the method may further comprise the steps of:

- supplying the storage container to the first storage container support through a first port column by means of a first cantilever container handling vehicle facing in a first direction, for example, facing south; and
- retrieving the storage container from the second storage container support through a second port column by means of a second cantilever container handling vehicle facing in a second direction which is opposite to the first direction, for example, facing north.

If the receiving area comprises a plurality of receiving positions, the second storage container can be received by the primary carriage and the first storage container can be retrieved from the primary carriage simultaneously at respective receiving positions. This operation would require two container handling vehicles.

Alternatively, the second storage container can be received by the primary carriage and the first storage container can be retrieved from the secondary carriage in succession at the same receiving position. This operation would require only one container handling vehicle.

In one aspect, the access station may comprise a latch for releasably connecting the primary carriage to the secondary carriage, wherein the method may further comprise the steps of:

- before transferring the first storage container, connect the primary carriage to the secondary carriage by means of the latch;
- after transferring the first storage container, release the primary carriage from the secondary carriage by means of the latch.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
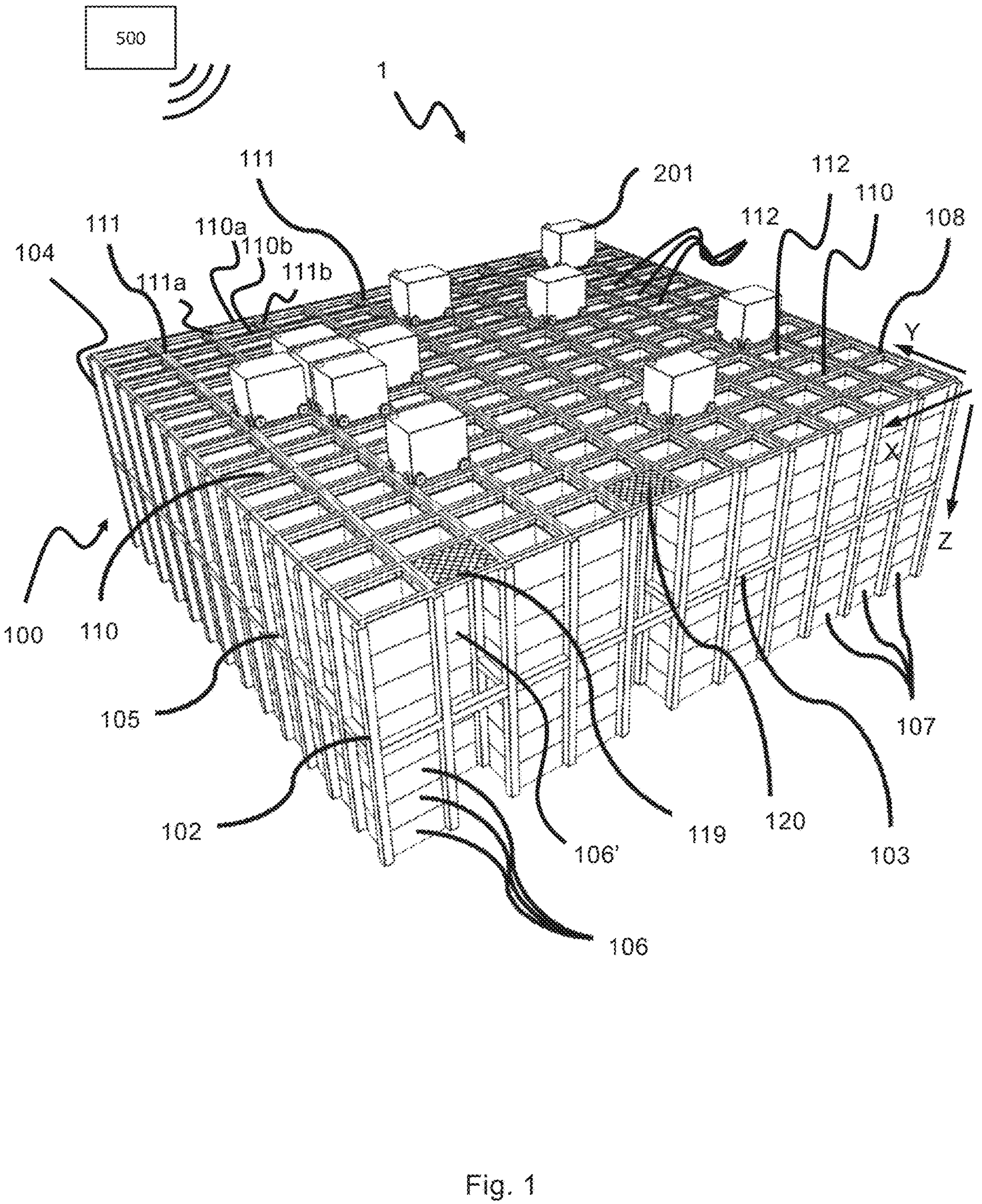
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
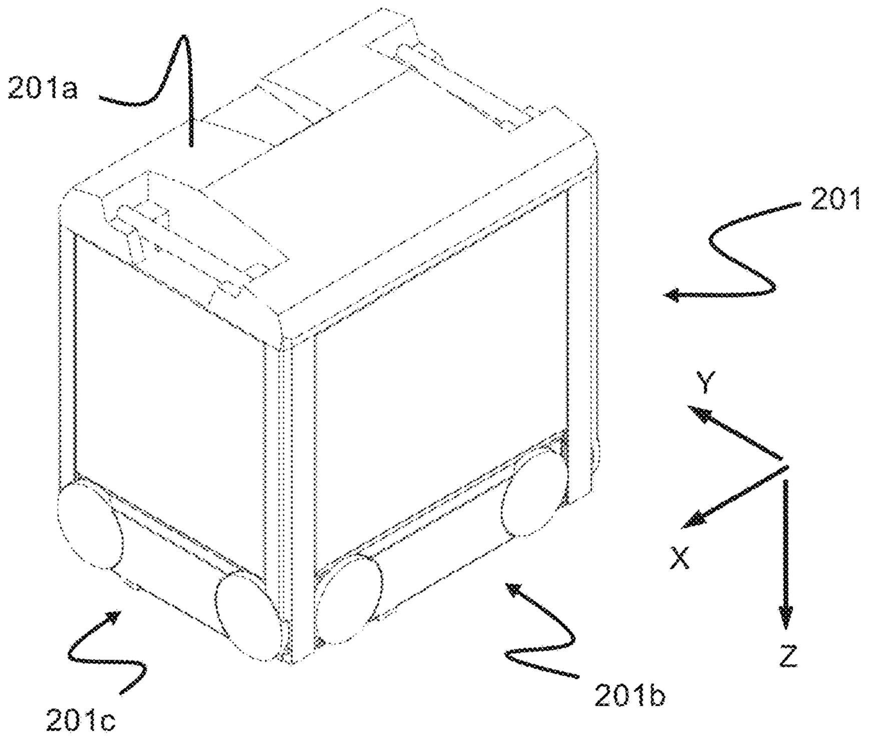
FIG. 2 is a perspective view of a prior art container handling vehicle having a centrally arranged cavity for carrying storage containers therein.
Figure 3:
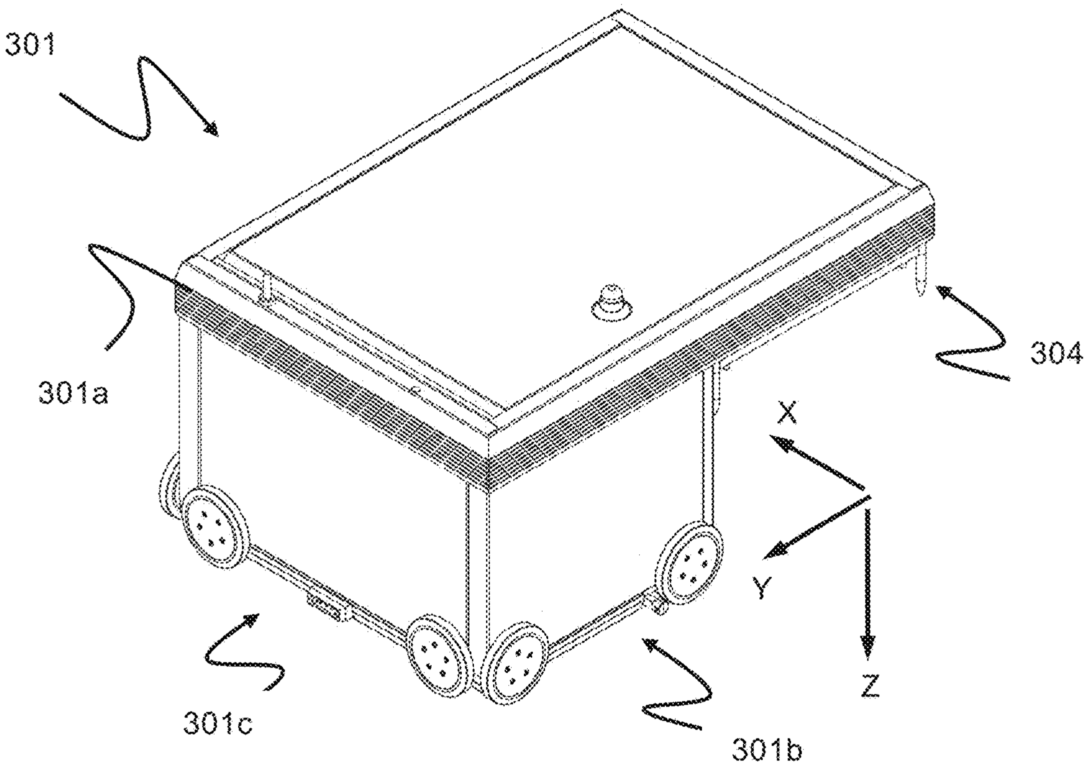
FIG. 3 is a perspective view of a prior art container handling vehicle having a cantilever for carrying storage containers underneath.
Figure 4:
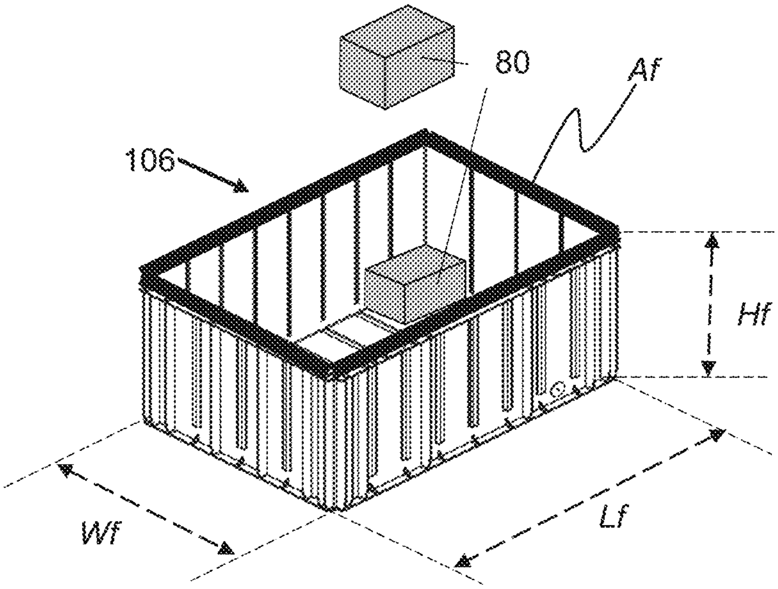
FIG. 4 is a perspective view of a storage container and product items stored in the storage container.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

The automated storage and retrieval system 1 can be in communication with one or several access stations 400 like those illustrated in FIG. 5-FIG. 21.

These access stations 400 may be arranged within the framework structure 100 of the storage and retrieval system 1 such that container handling vehicles 201, 301 can move above at least parts of the access station 400.

The access stations 400 may comprise their own framework structure 100. The framework structure 100 of the access station 400 and the framework structure 100 of the storage and retrieval system 1 can then be connected such that the rail system 108 can be extended on top of the framework structure 100.

The access stations 400 may also comprise their own framework structure 100 and rail system 108. The rail system 108 of the access station 400 and the rail system 108 of the storage and retrieval system 1 can then be connected such that a container handling vehicle 201, 301 can move above at least parts of the access station 400.

Figure 5:
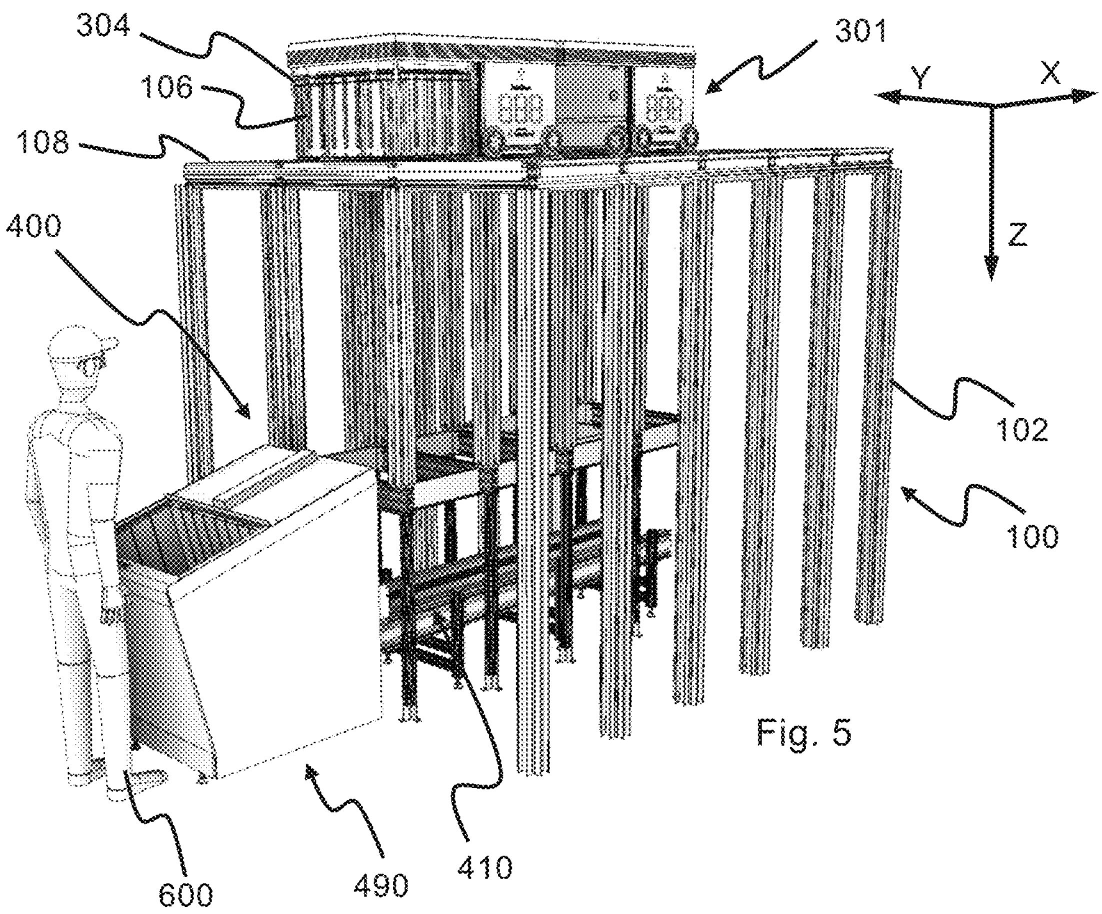
FIG. 5 is a perspective view of one access station within the framework structure of the storage columns where a storage container is presented to a picker, one container handling vehicle is waiting to retrieve a storage container from the access station, and one container handling vehicle is waiting to deliver a storage container to the access station.

FIG. 5 shows a perspective view of an access station 400. When in connection with the automated storage and retrieval system 1, the access station 400 may be used for presentation of a storage container 106 from the automated storage and retrieval system 1 to a picker 600. Different kinds of container handling vehicles 201, 301 may be used to deliver storage containers 106 from a storage location within the automated storage and retrieval system 1 to the access station 400 (not limited to those types shown in FIGS. 2 and 3). The container handling vehicles 201, 301 deliver and retrieve storage containers 106 from above the access station 400 through one or several port columns 119, 120, 121, 122. With several port columns 119, 120, 121, 122, (in the embodiment four port columns are shown) several container handling vehicles 201, 301 can simultaneously serve the same access station 400 (depending on the type of container handling vehicle, this may be two, three or four container handling vehicles).

The access station 400 can move the received storage container 106 to a position in which the picker 600 can be granted a limited access to the storage container 106 being presented, preferably only to an open side of the storage container 106 being presented and preferably only once the storage container 106 has reached the picking position and is properly presented to an access opening. Access may e.g. be granted by an automatically operated hatch. After a product 80 has been picked by the picker 600, the presented storage container 106 can be returned for storage in the automated storage and retrieval system 1. The access station 400 may then move the storage container 106 to a position from which it can be retrieved by some type of container handling vehicle 201, 301.

The access station 400 may have an access interface portion in the form of an access cabinet 490. The access cabinet 490 provides an interface to the picker 600. The figures show a human picker, however, the access stations 400 are also suitable for robotic pickers. The access cabinet 490 is typically arranged on the outside of the framework structure 100. This contributes to a safe working environment for the picker 600, whether human or robot.

In FIG. 5 one container handling vehicle 301 is waiting to retrieve a storage container 106 from the access station 400, and one container handling vehicle 301 is waiting to deliver a storage container 106 to the access station 400.

Figure 6:
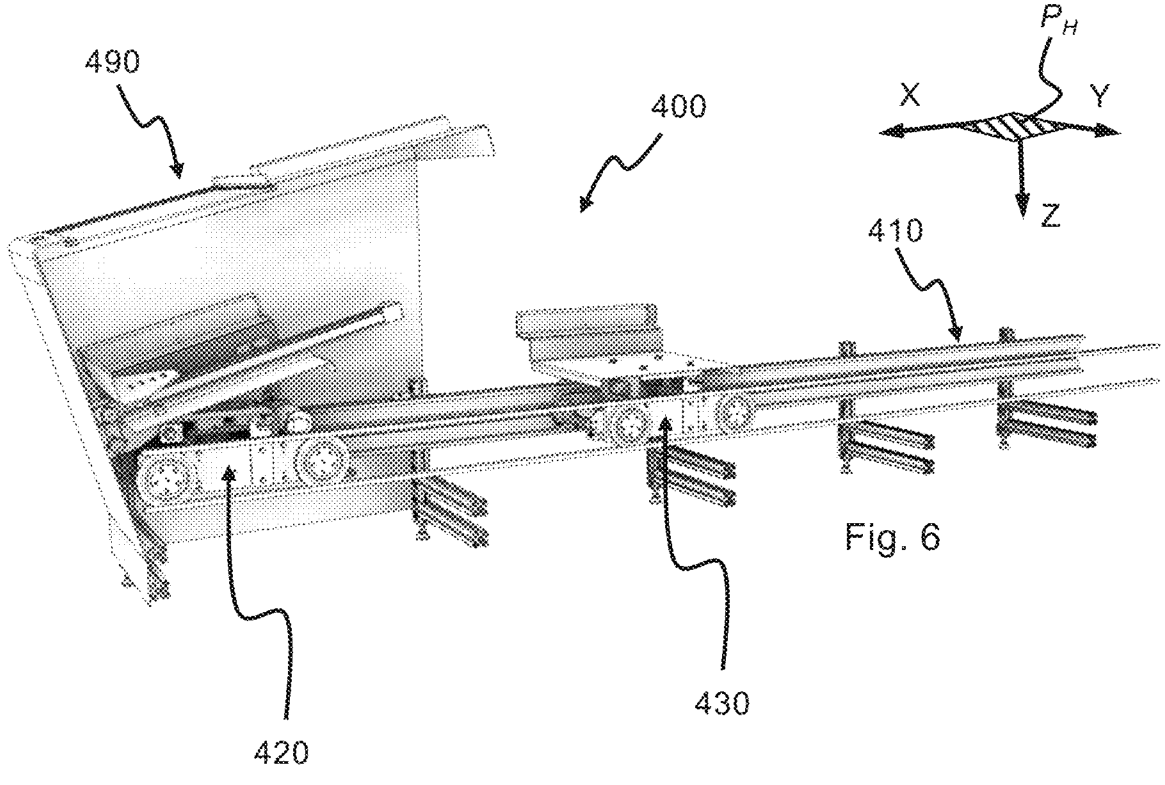
FIG. 6 is a vertical cross-section of the access station (with the framework structure of the storage columns omitted), the access station comprising a guiding frame, a primary carriage, a secondary carriage and an access cabinet.

FIG. 6 shows a vertical cross-section of the access station 400. The access station 400 comprises an access cabinet 490, a guiding frame 410 arranged in the horizontal plane $P_H$ and extending in the first direction X partly inside the access cabinet 490, a primary carriage 420 movable along the guiding frame 410, and a secondary carriage 230 movable along the guiding frame 410 independently of the primary carriage 420.

In FIG. 6, the primary carriage 420 is inside the access cabinet 490 and shown without a storage container 106, and the secondary carriage 430 is outside the access cabinet 490 also without a storage container 106. The primary carriage 420 is tilted towards the access cabinet 490 with a tilting angle similar to an inclination of an access face of the access cabinet 490, such that a storage container 106 carried by the primary carriage 420 would be aligned with an access opening of the access cabinet 490.

Figure 7:
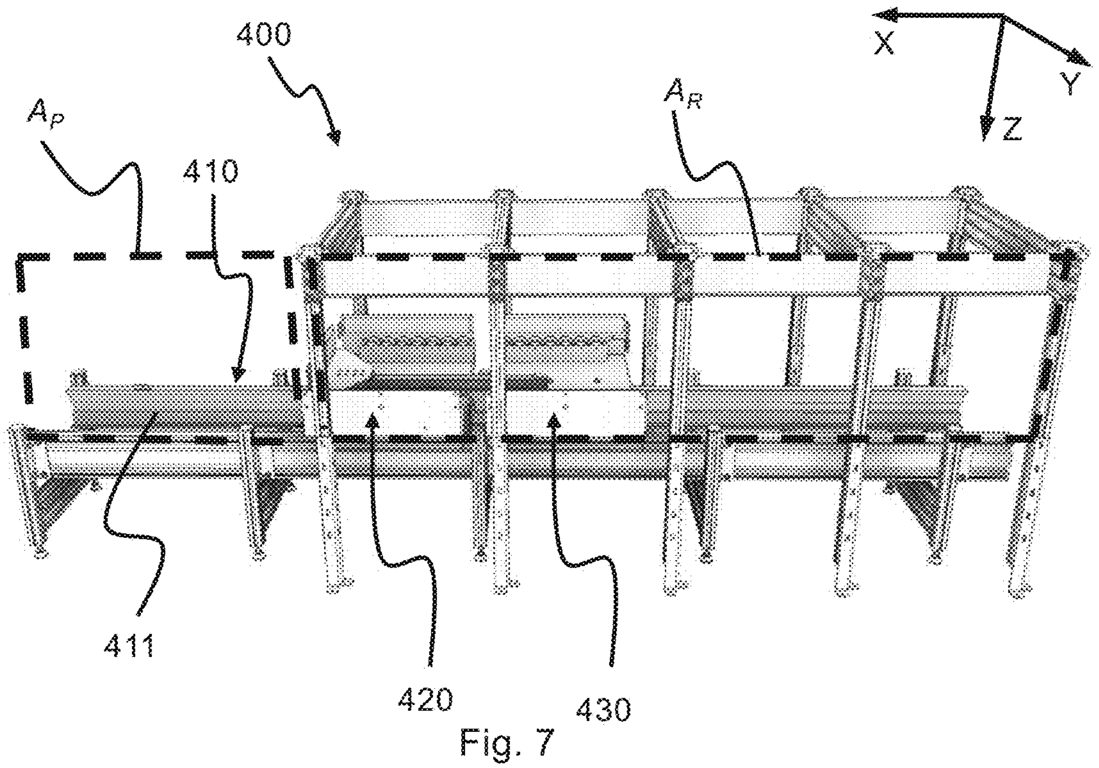
FIG. 7 is a side view of the access station (with the framework structure of the storage columns omitted), the access station having a picking position and a receiving area, between which the primary carriage and the secondary carriage can travel.

FIG. 7 shows a side view of the access station 400 without the access cabinet 490. The access station 400 has a receiving area $A_R$ that is configured for arrangement in the framework structure 100 of the automated storage and retrieval system 1 or in the framework structure 100 of the access station 400 itself. The receiving area $A_R$ is also configured for delivery and retrieval of storage containers 106 from the above container handling vehicles 201, 301.

The access station 400 also has a picking area $A_P$, forward of the receiving area $A_R$, configured for arrangement in the access cabinet 490.

The primary carriage 420 and the secondary carriage 430 can move along the guiding frame 410 between the receiving area $A_R$ and the picking area $A_P$.

The guiding frame 410 may be supported by legs arranging the guiding frame 410 in an appropriate height. Alternatively, the guiding frame 410 can be attached to the framework structure 100 at the appropriate height.

Figure 8:
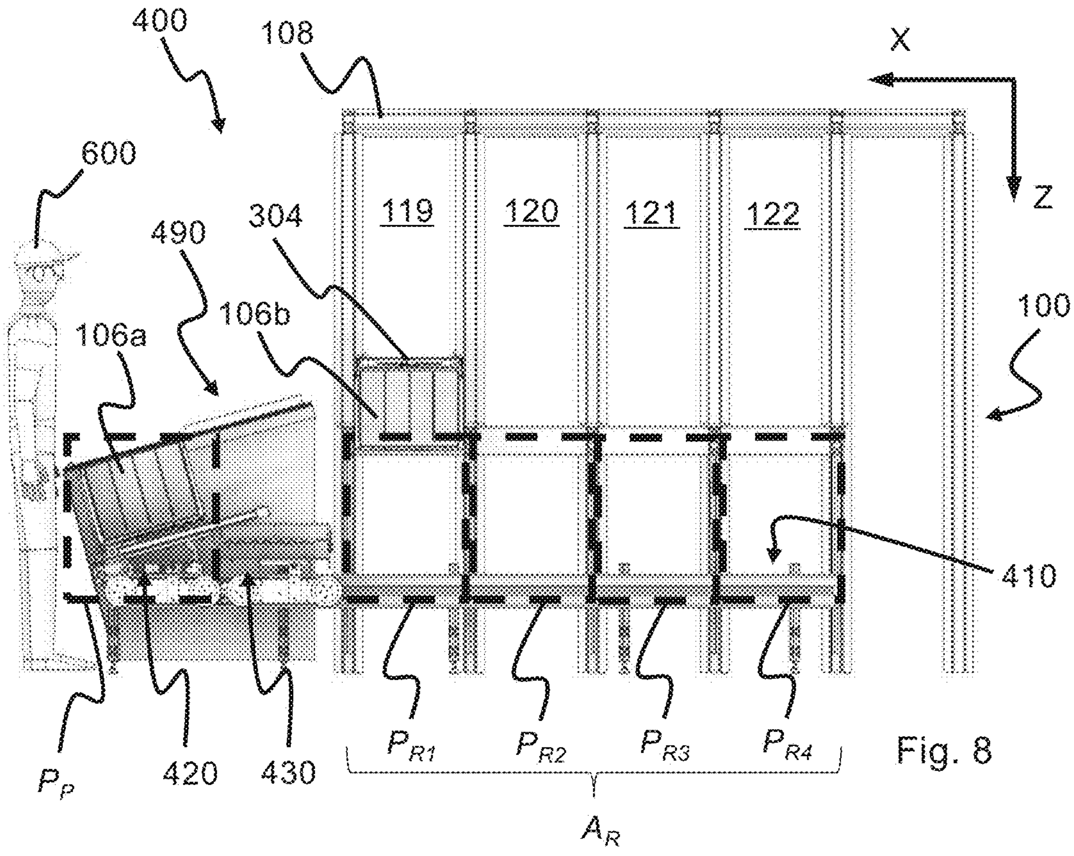
FIG. 8 is a vertical cross-section of the access station wherein the receiving area comprises four receiving positions vertically aligned with corresponding port columns.

FIG. 8 shows a vertical cross-section of the access station 400 wherein the receiving area $A_R$ is arranged in the framework structure 100. The receiving area $A_R$ comprises four receiving positions $P_{R1}$, $P_{R2}$, $P_{R3}$, $P_{R4}$. The first receiving position $P_{R1}$ is vertically aligned with the first port column 119; the second receiving position $P_{R2}$ is vertically aligned with the second port column 120; the third receiving position $P_{R3}$ is vertically aligned with the third port column 121; and the fourth receiving position $P_{R4}$ is vertically aligned with the fourth port column 122. Even further port columns and receiving positions may be provided as required.

In FIG. 8 the picking area $A_P$ is arranged in the access cabinet 490. The picking area $A_P$ comprises a picking position $P_P$ arranged in the furthest point of the picking area $A_P$, i.e. closest to the picker 600.

With the access station 400 configuration of FIG. 8, only the secondary carriage 430 has access to all receiving positions $P_R$, as the secondary carriage 430 cannot move past the fourth receiving position $P_{R4}$ to give the primary carriage 420 access. The guiding frame 410 could be extended beyond the last receiving position $P_R$, i.e. the fourth receiving position $P_{R4}$, without having to add further receiving positions $P_R$. Then both the primary carriage 420 and the secondary carriage 430 would have access to all receiving positions $P_R$. Thus, a part of the receiving area $A_R$, typically the aft part, does not need to be aligned with a port column 119, 120, 121, 122. Instead the space above the aft part of the receiving area $A_R$ can be used for storing storage containers 106.

FIG. 8-FIG. 17 show a sequence of how a storage container 106 can be delivered to the access station 400, presented to a picker 600, and then retrieved from the access station 400. FIG. 8-FIG. 17 show vertical cross-sections of the same access station 400.

In FIG. 8 the primary carriage 420 is in the picking position $P_P$ presenting a first storage container **106*a* to the picker 600; the secondary carriage 430 is in the picking area $A_P$ and connected to the primary carriage 420 by means of the latch 470, the secondary carriage 430 is ready to receive the first storage container 106*a* from the primary carriage 420; and a second storage container 106*b* has been lowered down through the first port column 119 by a first container handling vehicle 301, ready to be received by the primary carriage 420**.

Figure 9:
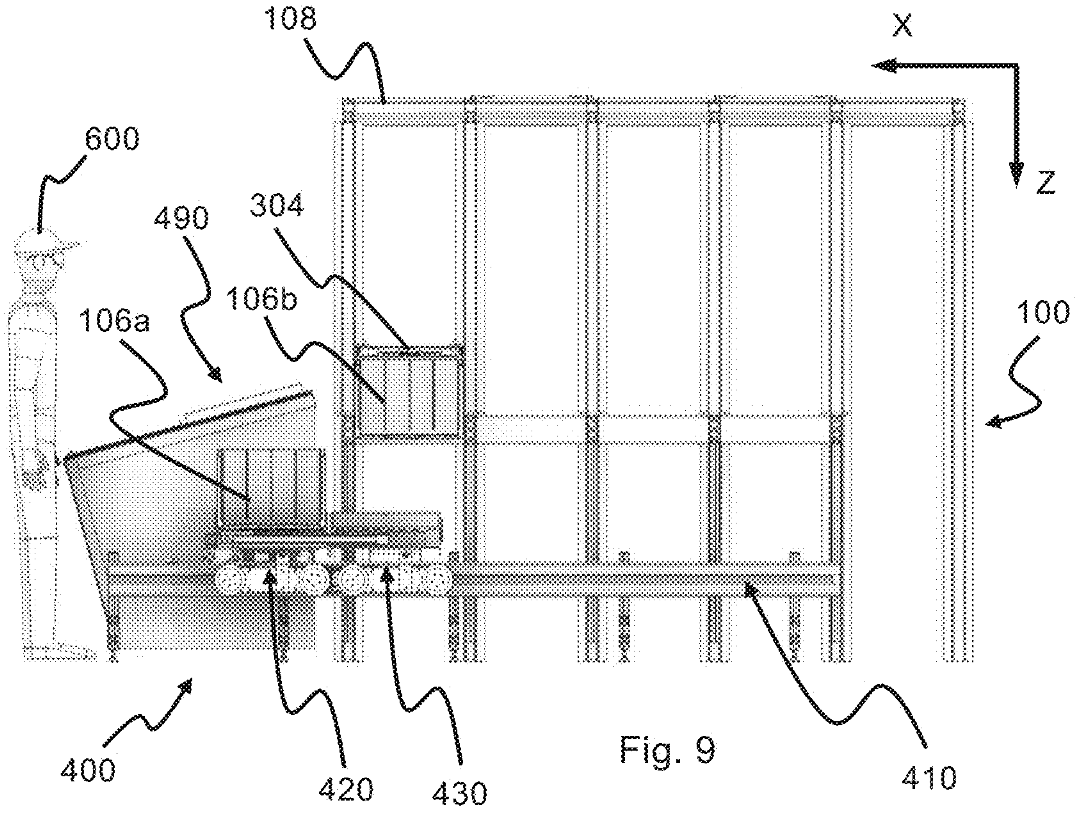
FIG. 9 is a vertical cross-section of the access station, in which a first storage container is about to be transferred from the primary carriage to the secondary carriage during travel towards the receiving area, and a second storage container is about to be lowered through the first port column by means of a first container handling vehicle (not shown in FIG. 9) for delivery when the primary carriage is in the first receiving position.

In FIG. 9 picking from the first storage container **106*a* is completed; the primary carriage 420 is about to start transferring the first storage container 106*a* to the secondary carriage 430, such that the transfer can be completed or at least initiated before the primary carriage 420 reaches the first receiving position $P_{R1}$; the primary carriage 420 and the secondary carriage 430 are moving towards the receiving area $A_R$; and the second storage container 106*b* is kept stationary in the first port column 119 by the first container handling vehicle 301**.

The primary carriage 420 comprises a transfer device 460 for displacement of the storage container 106 carried by the primary carriage 420, and the secondary carriage 430 is configured to receive a storage container 106 being displaced from the primary carriage 420 by means of the transfer device 460.

The primary carriage 420 may comprise a first coupling part 471 and the secondary carriage 430 may comprise a second coupling part 472, together forming a latch 470 for releasably connecting the primary carriage 420 to the secondary carriage 430. During transfer of the storage container 106 from the primary carriage 420 to the secondary carriage 430, the primary carriage 420 can preferably be releasably connected to the secondary carriage 430 by means of the latch 470.

Figure 10:
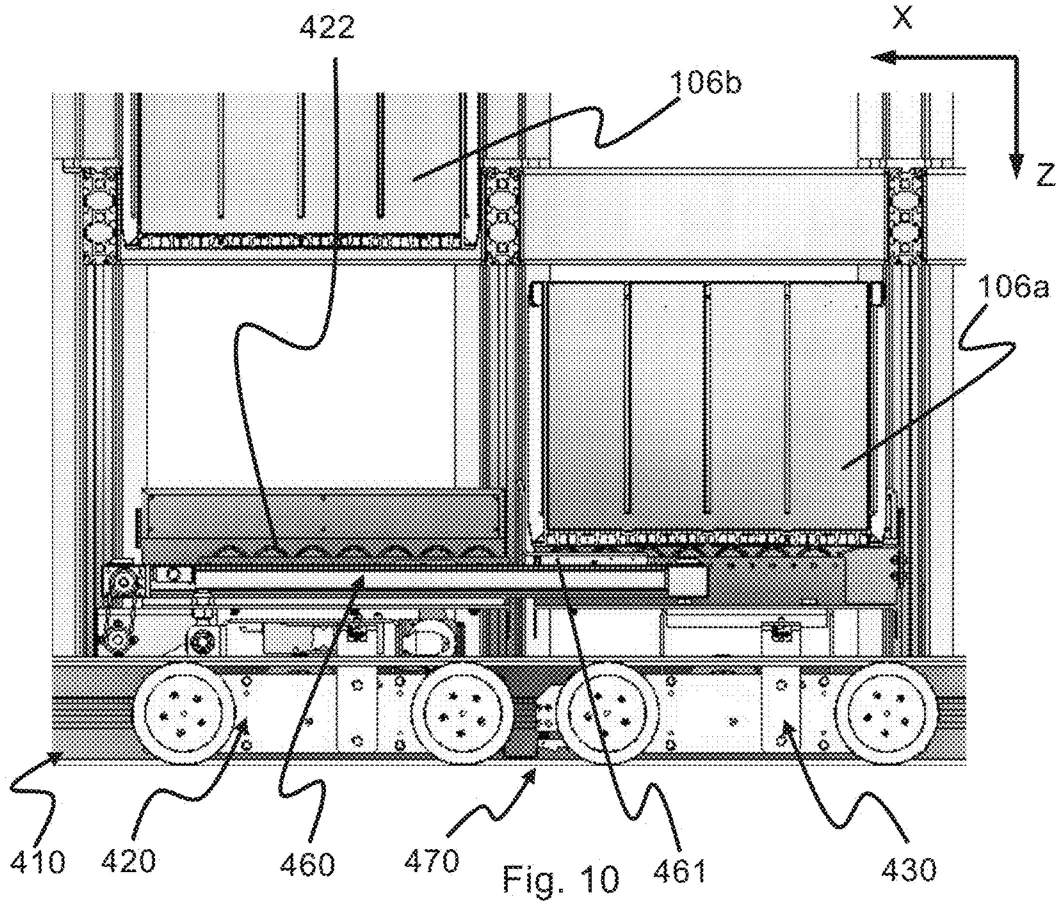
FIG. 10 is a vertical cross-section and enlargement of a portion of the access station of FIG. 9, in which the primary carriage is in the first receiving position and a transfer device of the primary carriage has transferred the first storage container to the secondary carriage.

In FIG. 10 the first storage container **106*a* has been transferred from the primary carriage 420 to the secondary carriage 430; the primary carriage 420 and the secondary carriage 430 are disconnected by means of the latch 470; the primary carriage 420 is in the first receiving position $P_{R1}$, below the second storage container 106*b* being kept stationary in the first port column 119 by the first container handling vehicle 301; and the slider 461 is extended, thus, the primary carriage 420 is not yet ready to receive the second storage container 106*b***.

Figure 11:
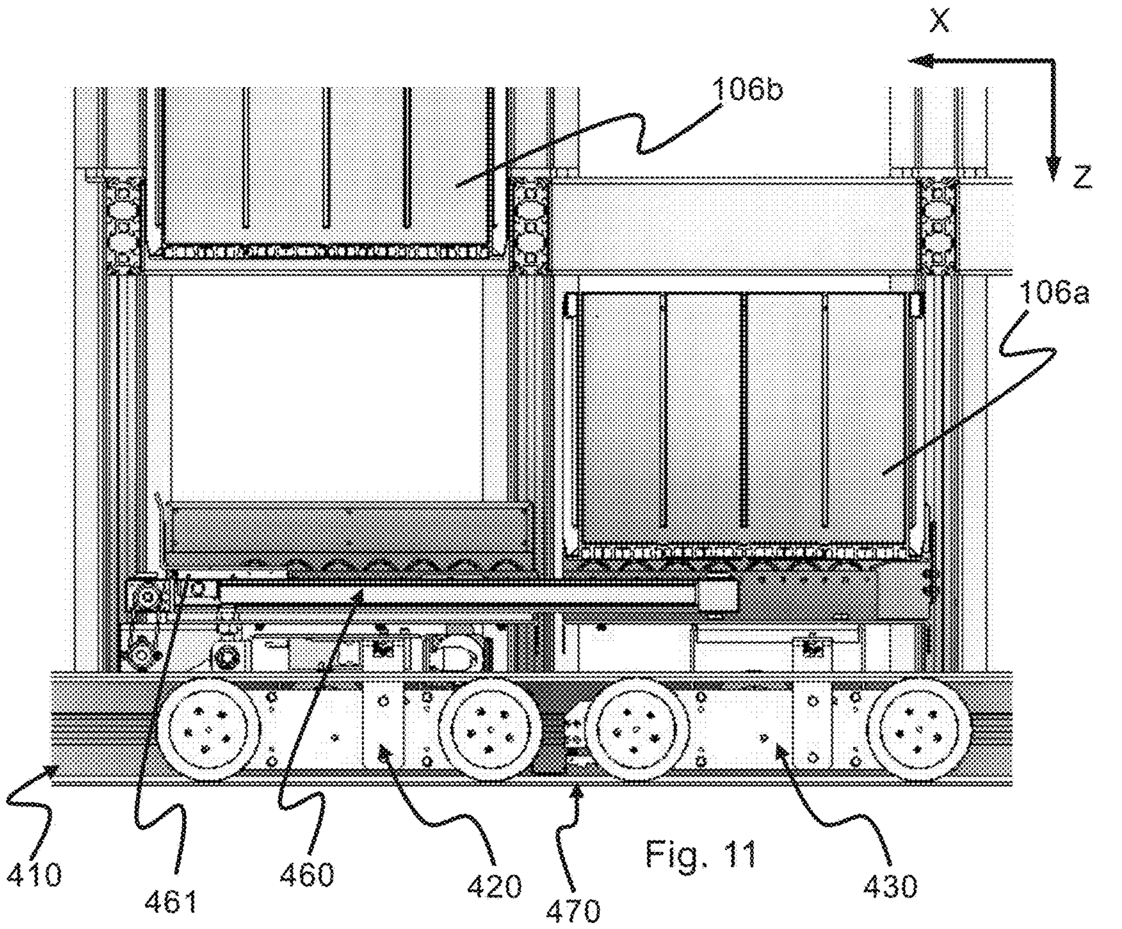
FIG. 11 is a vertical cross-section of the access station of FIG. 9, in which the transfer device has been retracted such that the primary carriage is in the first receiving position and ready to receive the second storage container.

In FIG. 11 the slider 461 is retracted, thus, the primary carriage 420 is ready to receive the second storage container **106*b* being kept stationary in the first port column 119 by the first container handling vehicle 301; and the latch 470 can release the primary carriage 420 from the secondary carriage 430**.

Figure 12:
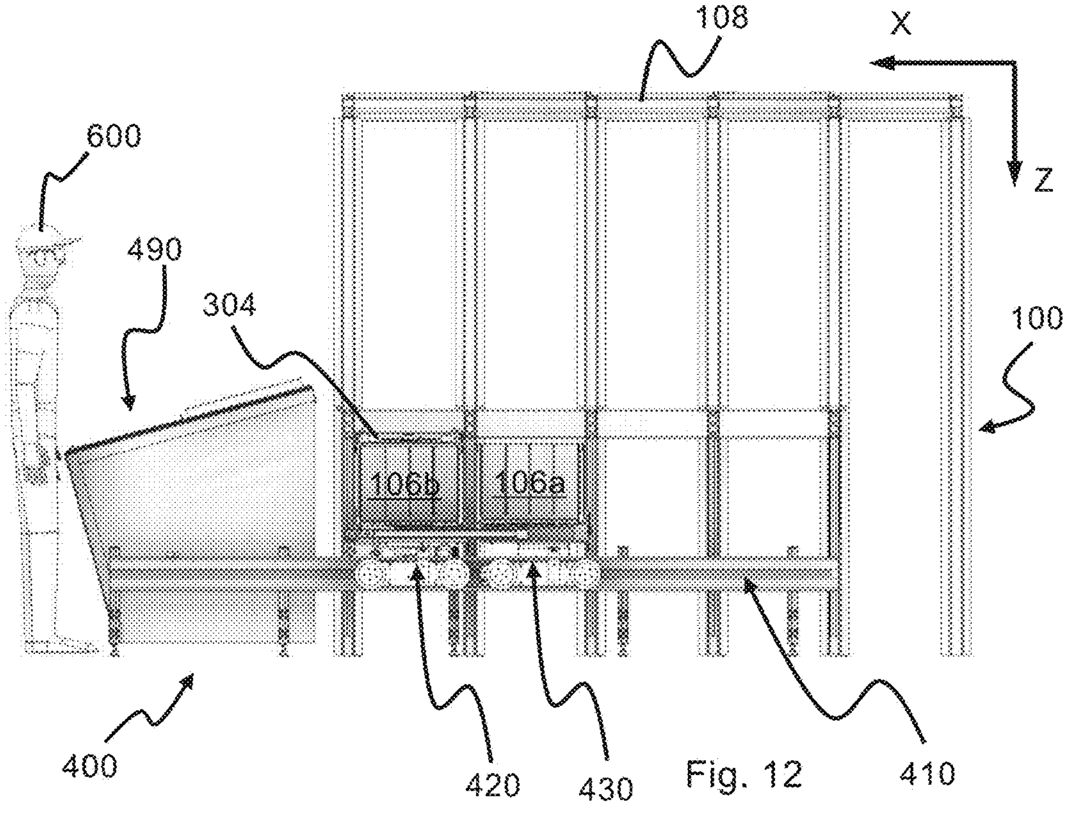
FIG. 12 is a vertical cross-section of the access station of FIG. 9, in which the primary carriage is in the first receiving position and the first container handling vehicle (not shown in FIG. 12) has lowered the second storage container onto the primary carriage.

In FIG. 12 the primary carriage 420 is in the first receiving position $P_{R1}$ receiving the second storage container **106*b* from the first container handling vehicle 301; and the secondary carriage 430** is in the receiving area $A_R$ waiting for the first receiving position $P_{R1}$ to be vacant.

Figure 13:
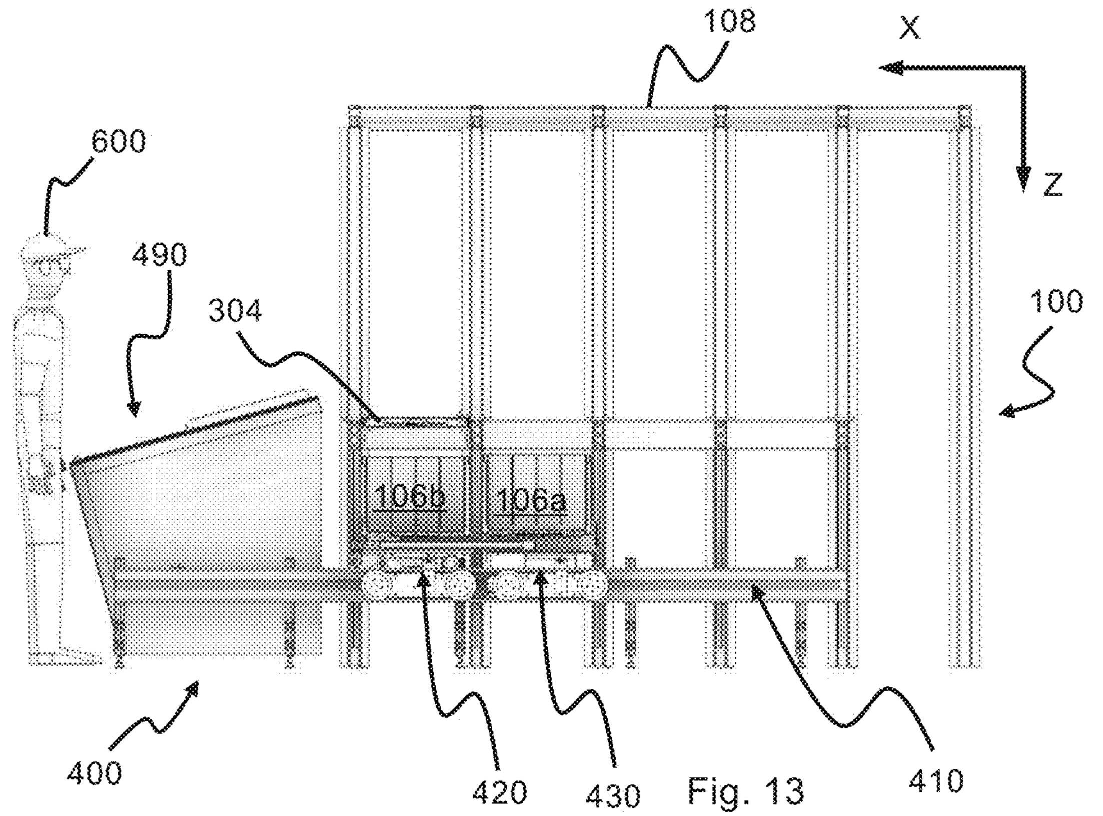
FIG. 13 is a vertical cross-section of the access station of FIG. 9, similar to FIG. 12, in which the second storage container on the primary carriage has been released from the lifting device and the first storage container is being carried by the secondary carriage.

In FIG. 13 the primary carriage 420 has received the second storage container **106*b* in the first receiving position $P_{R1}$; the first container handling vehicle 301 has disconnected the gripping device 304 from the second storage container 106*b* and lifted the gripper device 304 in the first port column 119; and the secondary carriage 430 is in the receiving area $A_R$ waiting for the first receiving position $P_{R1}$ to be vacated by the primary carriage 420**.

If a second container handling vehicle 301 is available for retrieving the first storage container **106*a*, this can be done simultaneously in one of the other receiving positions $P_{R2}$, $P_{R3}$, $P_{R4}$ through one of the other port columns 120, 121, 122**.

Figure 14:
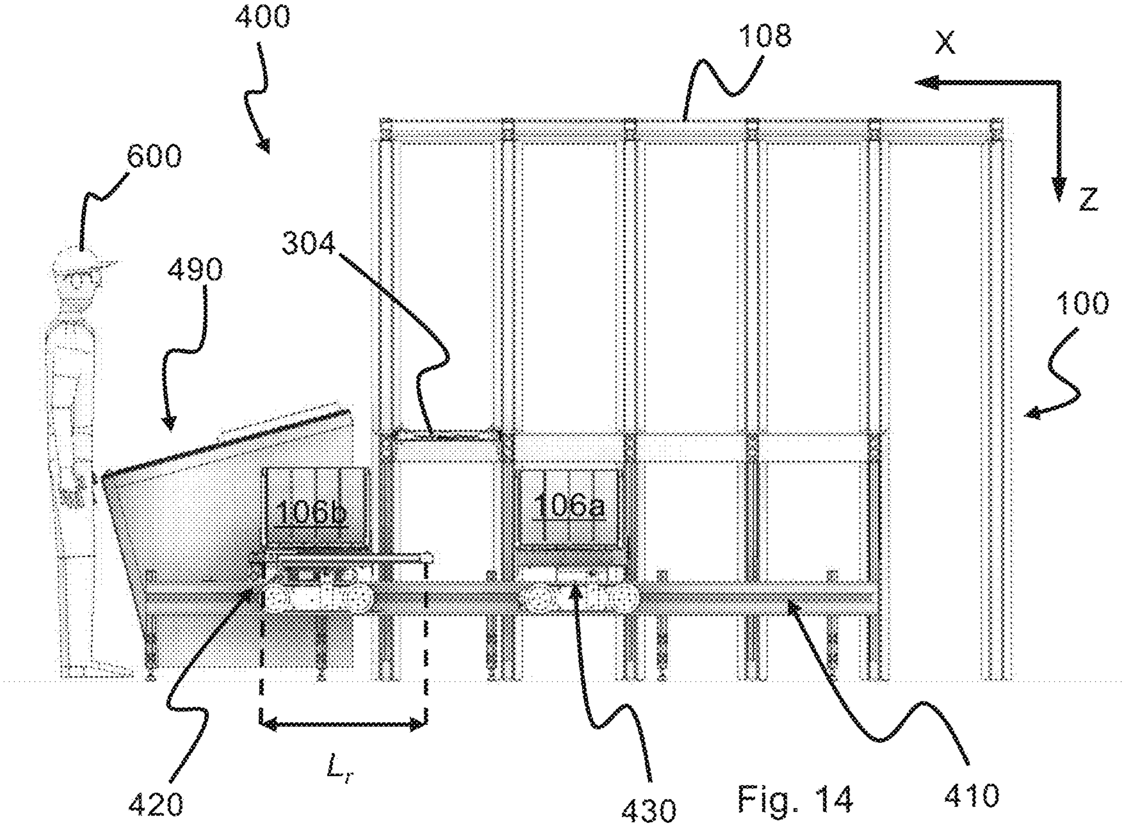
FIG. 14 is a vertical cross-section of the access station of FIG. 9, in which the primary carriage is moving towards the picking position and the secondary carriage is in the second receiving position about to move to the first receiving position.

In FIG. 14 the primary carriage 420 is moving towards the picking position $P_P$ carrying the second storage container 106*b*; the secondary carriage 430 is about to move towards the first receiving position $P_{R1}$ carrying the first storage container 106*a*; and the gripper device 304 of the first container handling vehicle 301 is stationary in the first port column 119.

Figure 15:
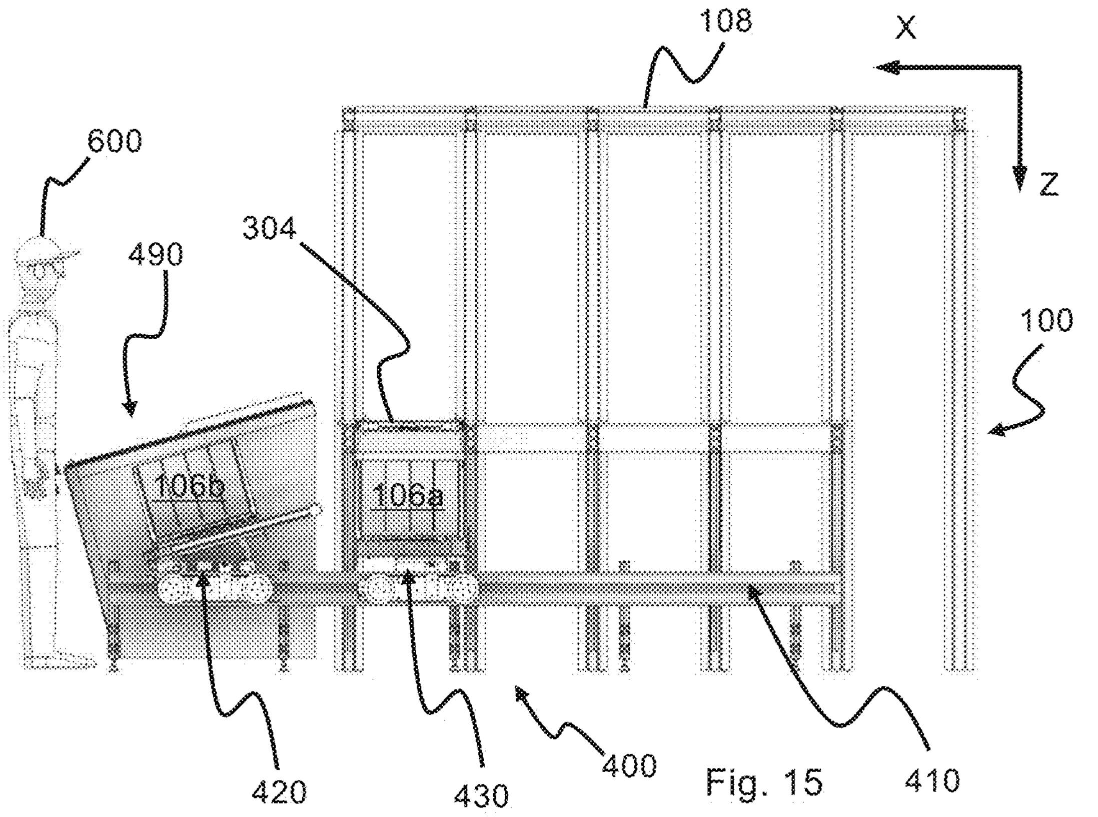
FIG. 15 is a vertical cross-section of the access station of FIG. 9, in which the primary carriage is in the picking position and the secondary carriage is in the first receiving position.

In FIG. 15 the primary carriage 420 is in the picking position $P_P$ preparing to present the second storage container 106*b* to the picker 600; the secondary carriage 430 is in the first receiving position $P_{R1}$ carrying the first storage container 106*a*; and the first container handling vehicle 301 (not shown in FIG. 15) is about to lower the gripper device 304 towards the first storage container 106*a*. The second storage container 106*b* is preferably tilted by the primary carriage 420 before it reaches the picking position $P_P$.

Figure 16:
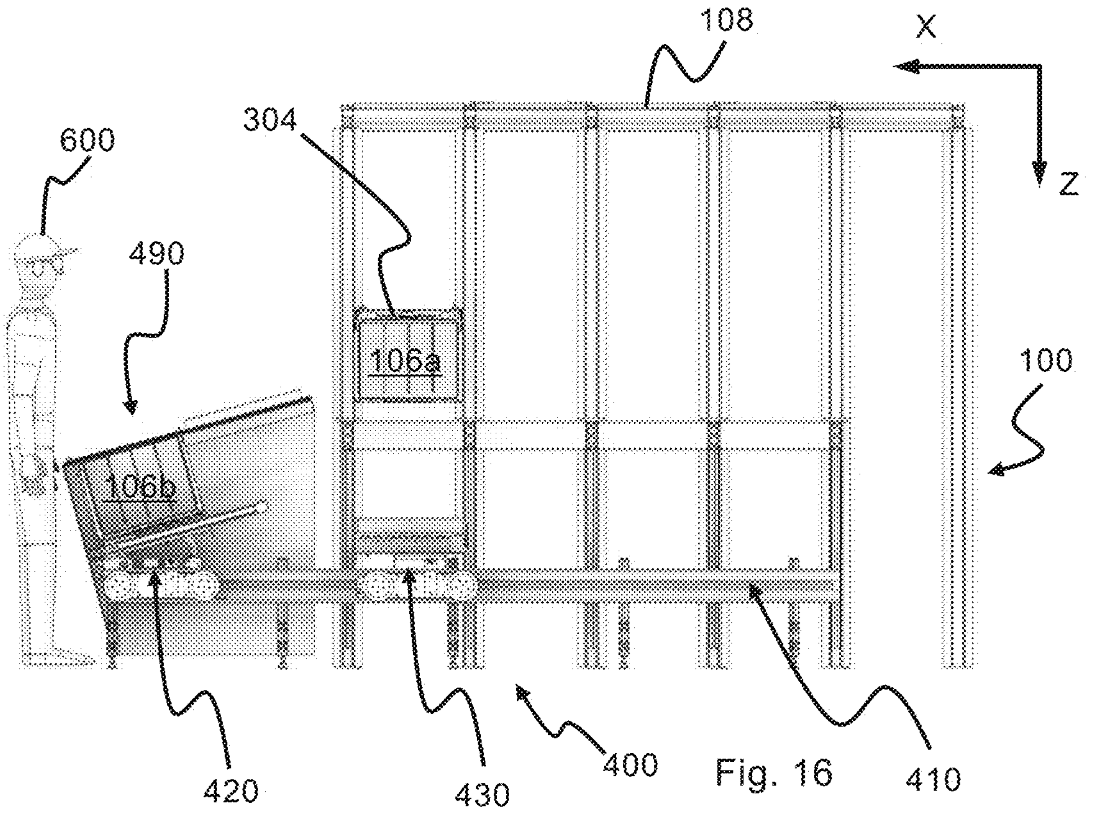
FIG. 16 is a vertical cross-section of the access station of FIG. 9, in which the second storage container is presented to a picker and the first storage container is retrieved by the first container handling vehicle (not shown in FIG. 16)

In FIG. 16 the primary carriage 420 is in the picking position $P_P$ presenting the second storage container 106*b* to the picker 600; the first container handling vehicle 301 is retrieving the first storage container 106*a* through the first port column 119; and the secondary carriage 430, no longer carrying a storage container 106, is about to move towards the primary carriage 420 to receive the second storage container 106*b* from the primary carriage 420.

Figure 17:
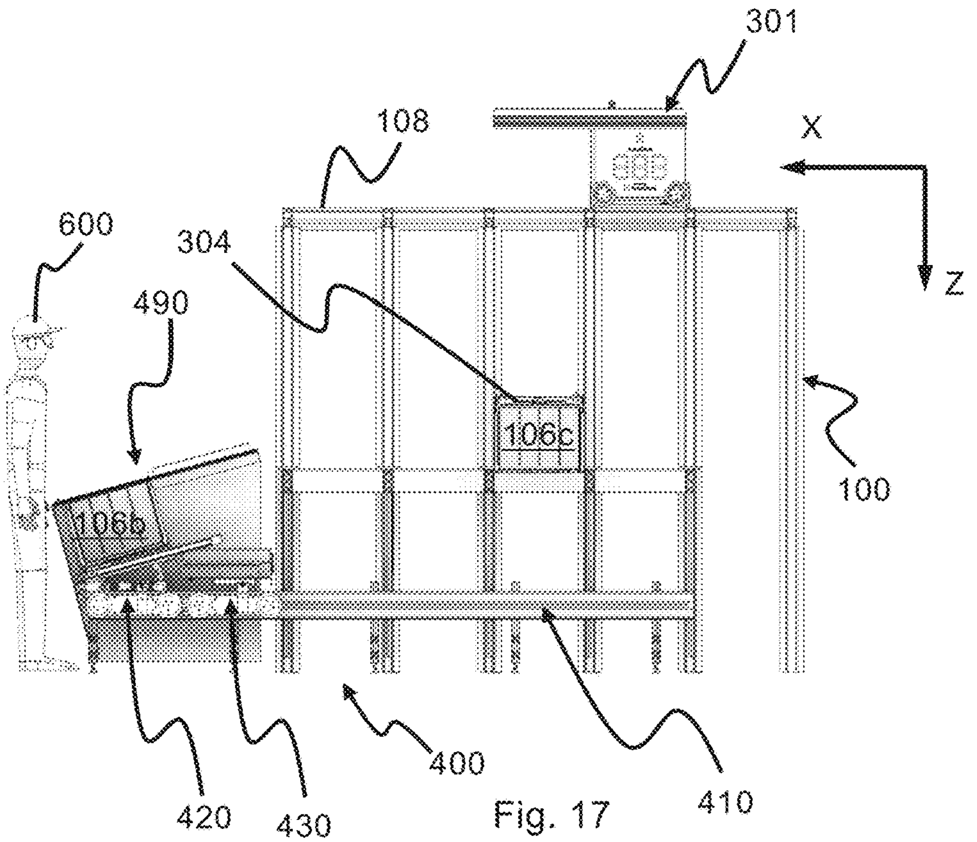
FIG. 17 is a vertical cross-section of the access station of FIG. 9, in which the secondary carriage has approached the primary carriage for transfer of the second storage container, and a third storage container is being lowered through the third port column by means of a second container handling vehicle (the container handling vehicle shown in FIG. 17) for delivery in the third receiving position.

In FIG. 17 the primary carriage 420 is in the picking position $P_P$ presenting the second storage container 106*b* to the picker 600; the secondary carriage 430 is in the picking area $A_P$ and connected to the primary carriage 420 by means of the latch 470, the secondary carriage 420 is ready to receive the second storage container 106*b* from the primary carriage 420; and a third storage container 106*c* has been lowered down through the third port column 121 by a second container handling vehicle 301, ready to be received by the primary carriage 420. The situation in FIG. 17 is thus similar to the situation in FIG. 8 and the sequence can be repeated.

Alternatively, the secondary carriage 430 could move to the third receiving position $P_{R3}$, receive the third storage container 106*c* from the second container handling vehicle 301, and then move to a different part of the receiving area $A_R$, e.g. the fourth receiving position $P_{R4}$, allowing the primary carriage 420 to access the third receiving position $P_{R3}$. The primary carriage 420 can then move to the third receiving position $P_{R3}$ such that the second storage container 106*b* can be retrieved by the second container handling vehicle 301. The secondary carriage 430 can then be connected to the primary carriage 420 by means of the latch 470. The third storage container 106*c* can then be transferred from the secondary carriage 430 to the primary carriage 420 while the primary carriage 420 and the secondary carriage 430 travel together towards the picking area $A_P$. The third storage container 106*c* is preferably transferred to the primary carriage 420 before the primary carriage reaches the picking position $P_P$, such that the third storage container 106*c* can be presented to the picker 600 as soon as the primary carriage 420 reaches the picking position $P_P$. It is also preferred that any tilting of the third storage container 106*c* can be performed before the primary carriage 420 reaches the picking position $P_P$. This sequence requires that the transfer device 460 is configured for displacement of a storage container 106 positioned on the second storage container support 432, in addition to or instead of being configured for displacement of a storage container 106 positioned on the first storage container support 422.

Figure 18:
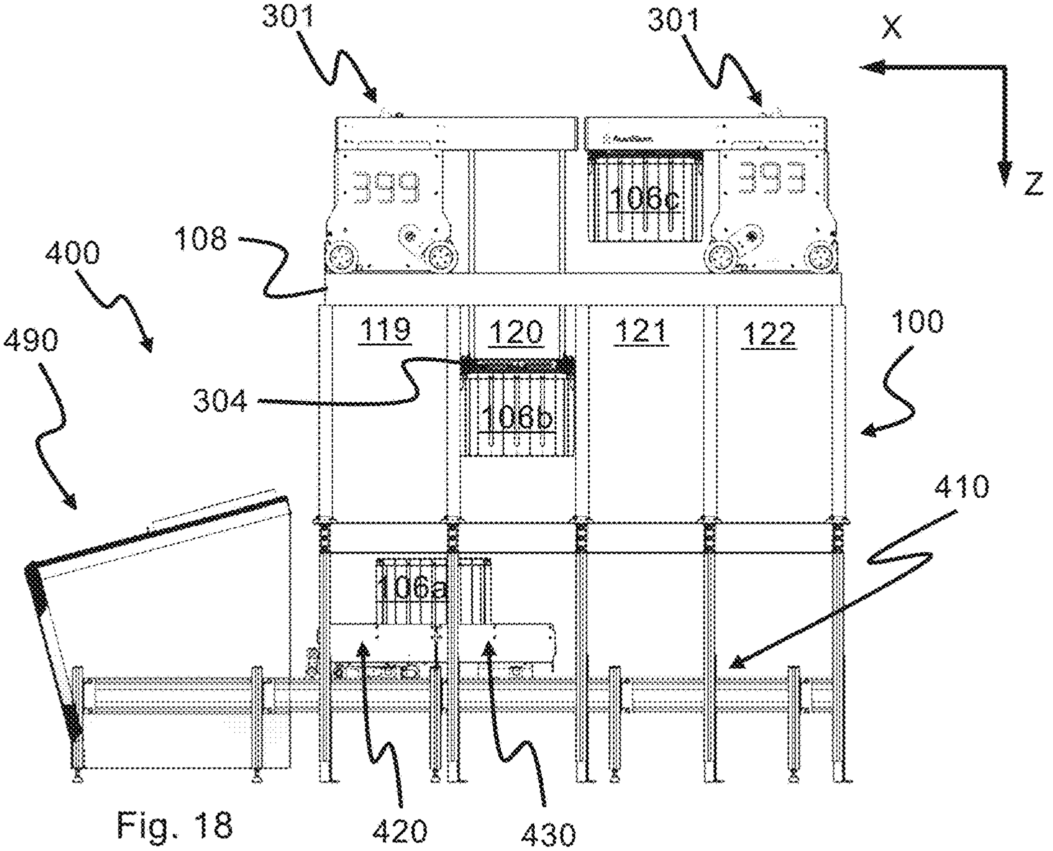
FIG. 18 is a side view of the access station wherein two opposite oriented container handling vehicles are delivering storage containers to different port columns of the same access station.

FIG. 18 shows a side view of the access station 400 illustrating a different situation than the preceding sequence of FIG. 8 FIG. 17.

In FIG. 18 the primary carriage 420 and the secondary carriage 430 are moving in the receiving area $A_R$ while transferring the first storage container 106*a* from the primary carriage 420 to the secondary carriage 430; the first container handling vehicle 301 is lowering the second storage container 106*b* through the second port column 120; and the second container handling vehicle 301, oriented in the oppose direction of the first container handling vehicle 301, is ready to lower the third storage container 106*c* through the third port column 121. After transferring the first storage container 106 to the secondary carriage 430, the primary carriage 420 may receive the second storage container 106*b* from the first container handling vehicle 301 in the second receiving position $P_{R2}$ or receive the third storage container 106*c* from the second container handling vehicle 301 in the third receiving position $P_{R3}$.

By having at least two receiving positions $P_R$, the access station 400 can be served by cantilever container handling vehicles 301 with opposite orientation.

Figure 19:
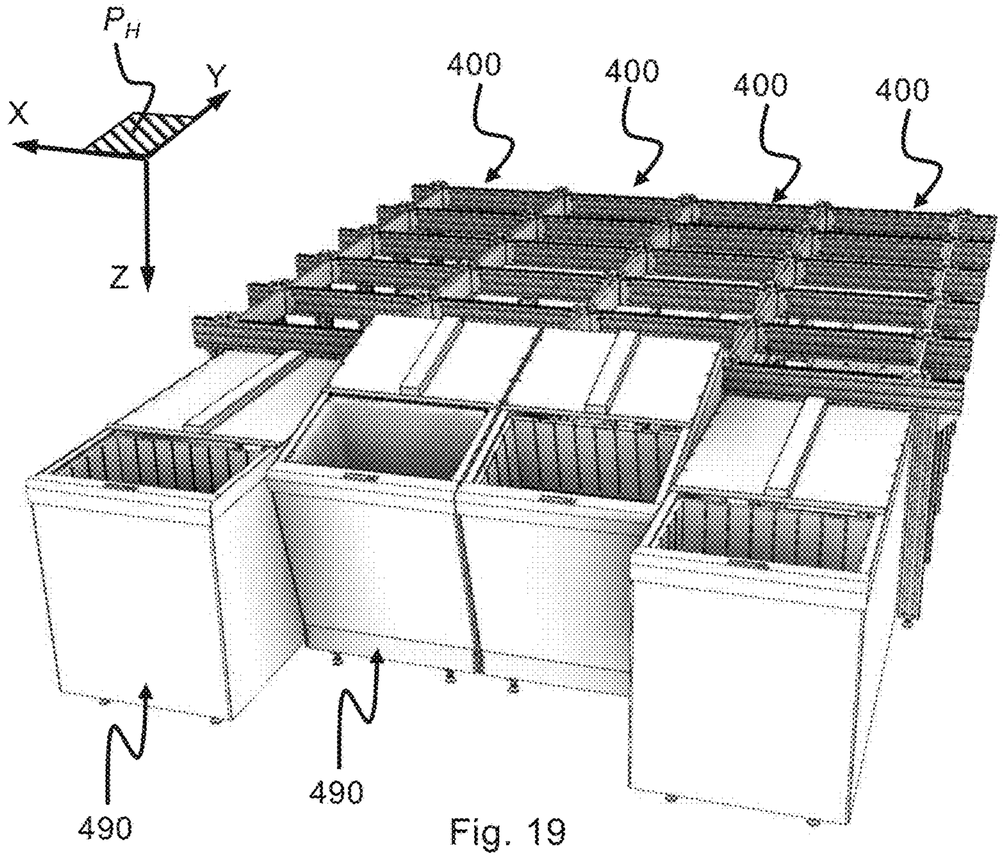
FIG. 19 is a perspective view of four access stations arranged side-by-side.
Figure 20:
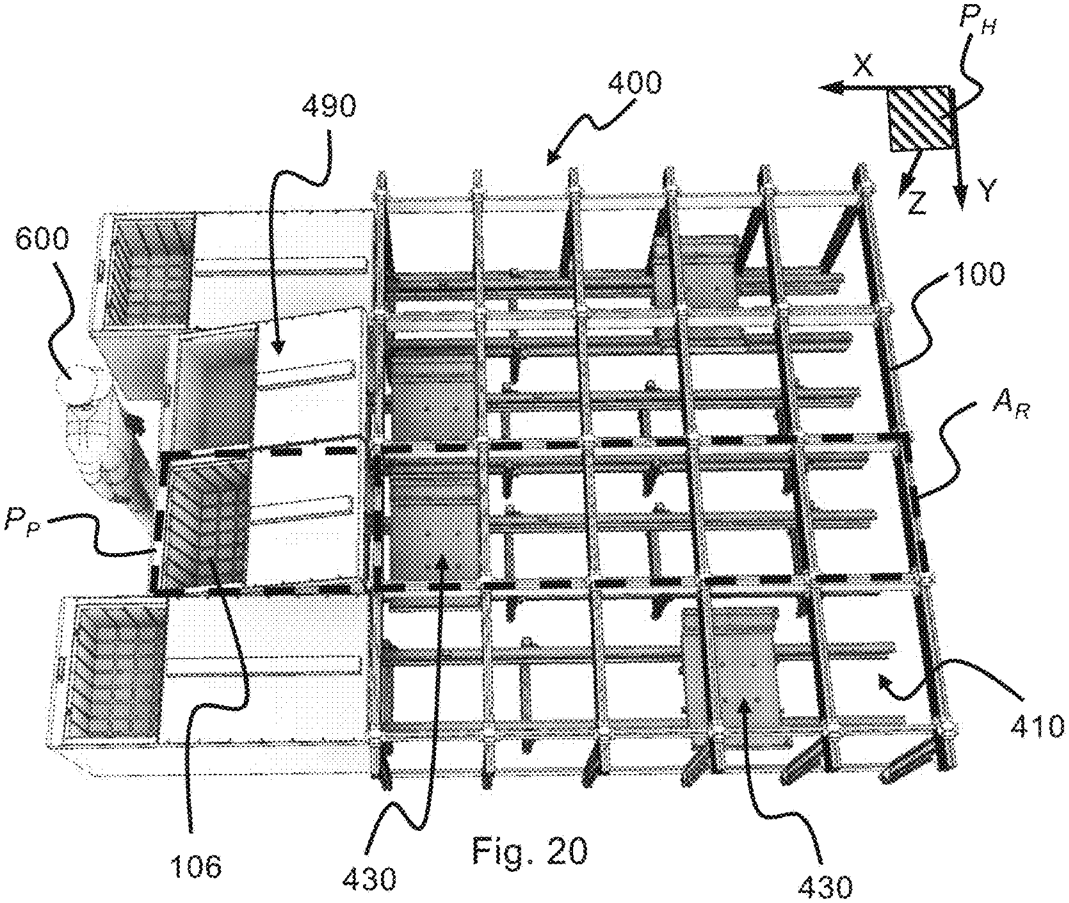
FIG. 20 is a top view of the four access stations of FIG. 19.
Figure 21:
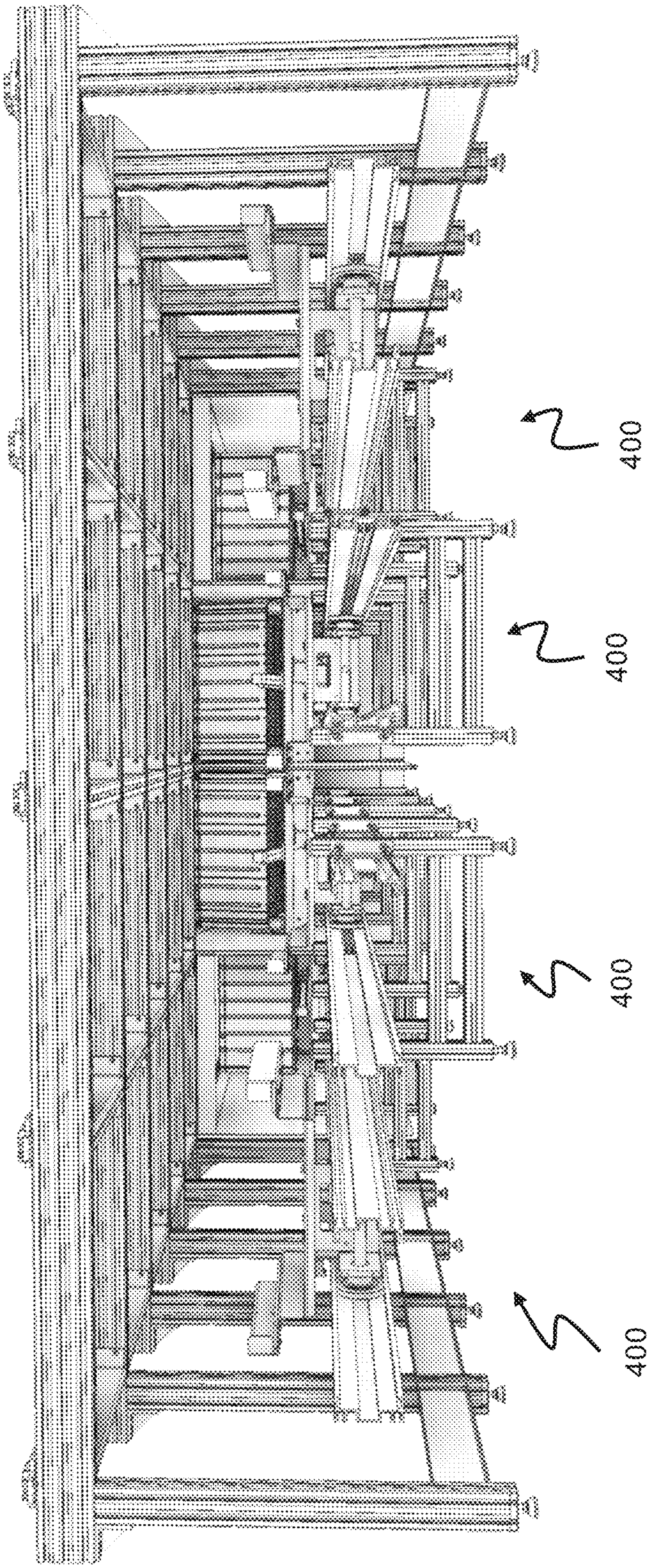
FIG. 21 is a rear view of the four access stations of FIG. 19.

FIG. 19 shows a perspective view of several access stations 400. FIG. 20 and FIG. 21 show respective top and a rear views of the same access stations 400. As illustrated, the access station 400 may have a substantially horizontal interface towards the picker 600. Alternatively, the access station 400 may have an interface towards the picker 600 that is tilted relative to the horizontal plane $P_H$. The tilted interface will allow a more ergonomic working position for a human picker and a better overview of the contents of the storage container 106. In some installations it may be preferable to arrange different access stations 400 to present storage containers 106 to a picker at different heights.

The access station 400 may be produced with a preferred height and be provided with adjustable feet. The height of the access station 400 can preferably be adapted to the average height of a human picker. The height of the access station 400 may preferably also be adapted to the height $H_f$ of the storage containers 106.

The access station 400 may be produced with a preferred width. The width of the access station 400 can preferably be adapted to the length $L_f$ or width $W_f$ of the storage containers 106, depending on the orientation of the storage container 106 in the access station 400 (e.g., based on which side of the storage system it is arranged on). The access station 400 may be provided with a smaller width if the storage container 106 is oriented with its shortest side in the width direction of the access station 400.

By adapting the width of the access station 400 to the width of one storage column 105, two or more access stations 400 can be arranged side-by-side in a space efficient manner, i.e. not spaced apart. Such arrangement of the access stations 400 may enable the human picker to be more efficient due to shorter distances between the access stations 400. The width of a storage column may be seen as the width of a storage container 106 with an additional width of a rail 110,111 of the rail system 108 (half a rail width arranged on each side of the storage container 106), and thus when an access station 400 corresponds to a width of a storage column, access stations can be arranged in a side-by-side relationship corresponding to the positions of the storage columns and allowing the access stations 400 to be provided in adjacent rows of storage columns.

FIG. 19, FIG. 20 and FIG. 21 show four access stations 400 arranged side-by-side. Two access stations 400 with tilted access cabinets 490 are arranged in the middle with one access station 400 with horizontal access cabinet 490 arranged on either side. The horizontal access cabinets 490 are longer than the tilted access cabinets 490. In this way the access cabinets 490 may partly encircle a picker 600 standing in front of the two centre access stations 400. As an example, storage containers 106 to be picked from can be presented in the middle access stations 400 and consolidation bins being picked to can be presented in the access stations 400 on either side. Alternatively, all access stations 400 can present storage containers 106 to be picked from.

Figure 22:
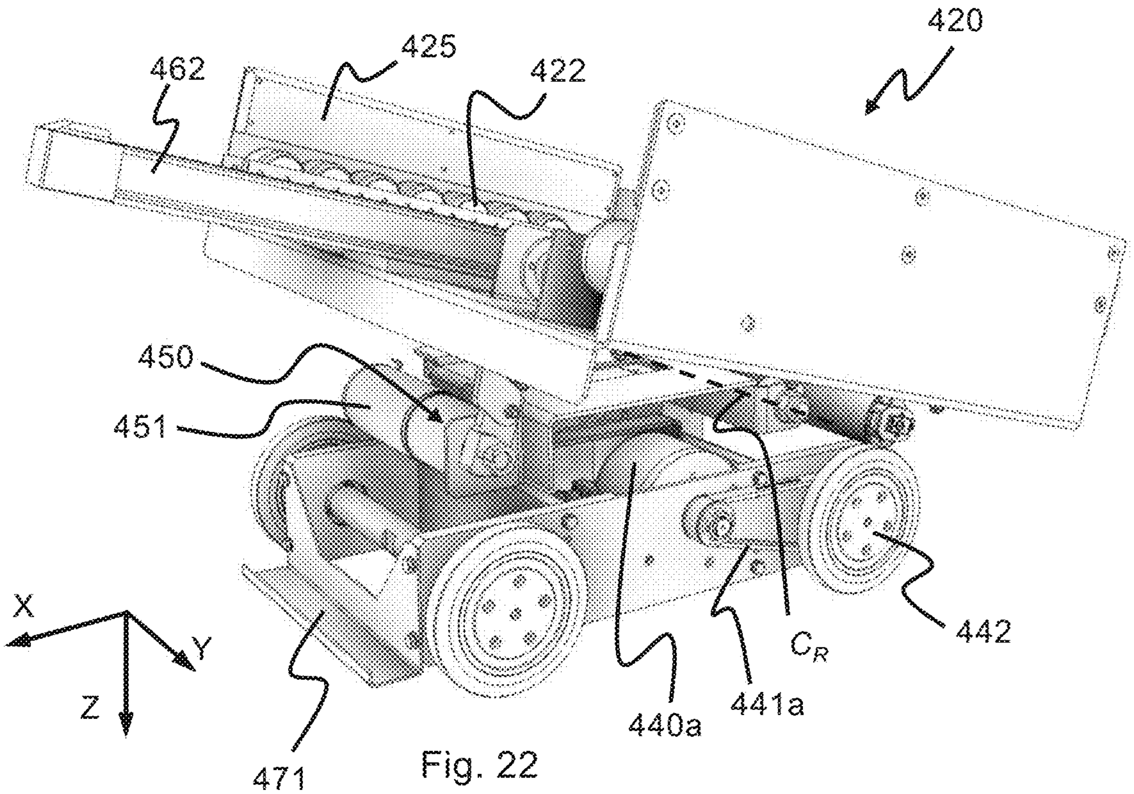
FIG. 22 is a perspective view of an exemplary embodiment of the primary carriage comprising a primary carriage base, a primary carriage displacement motor, a first storage container support, a transfer device, and a tilting device.
Figure 23:
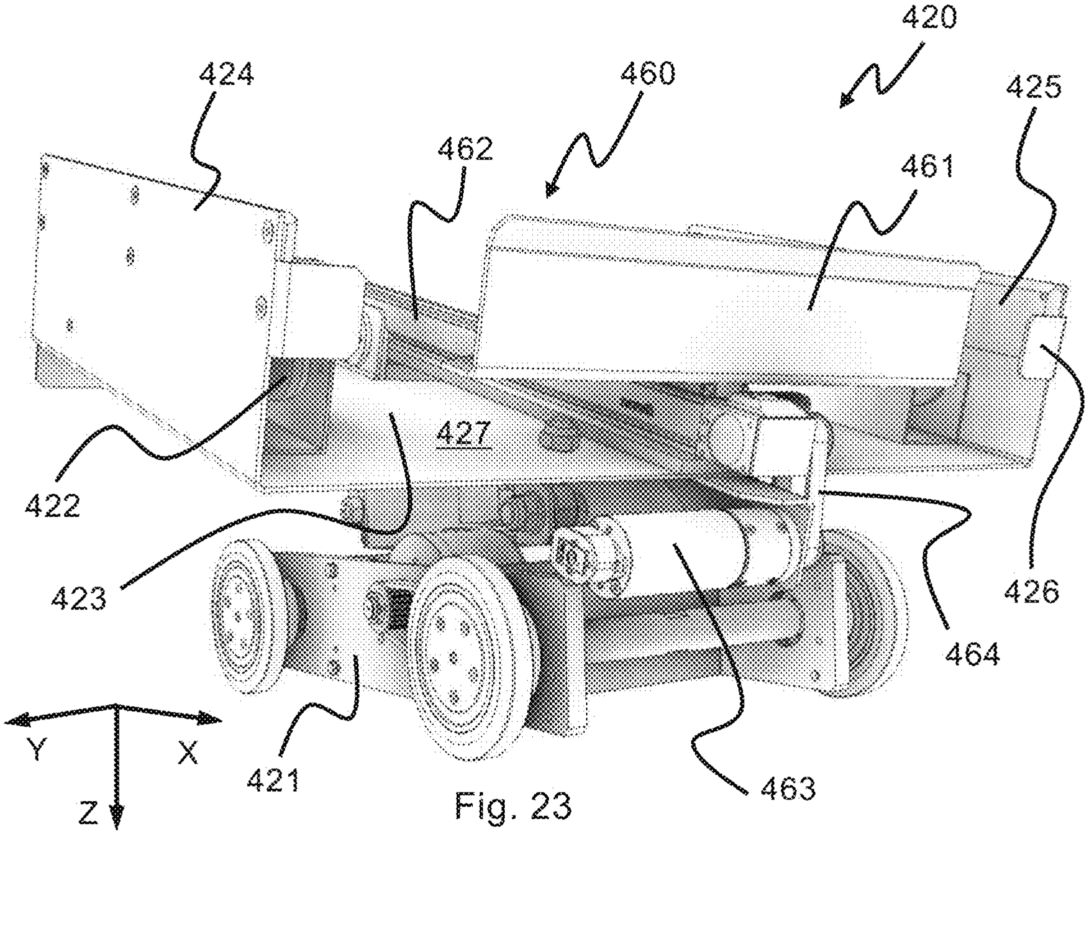
FIG. 23 is another perspective view of the primary carriage of FIG. 22.
Figure 24:
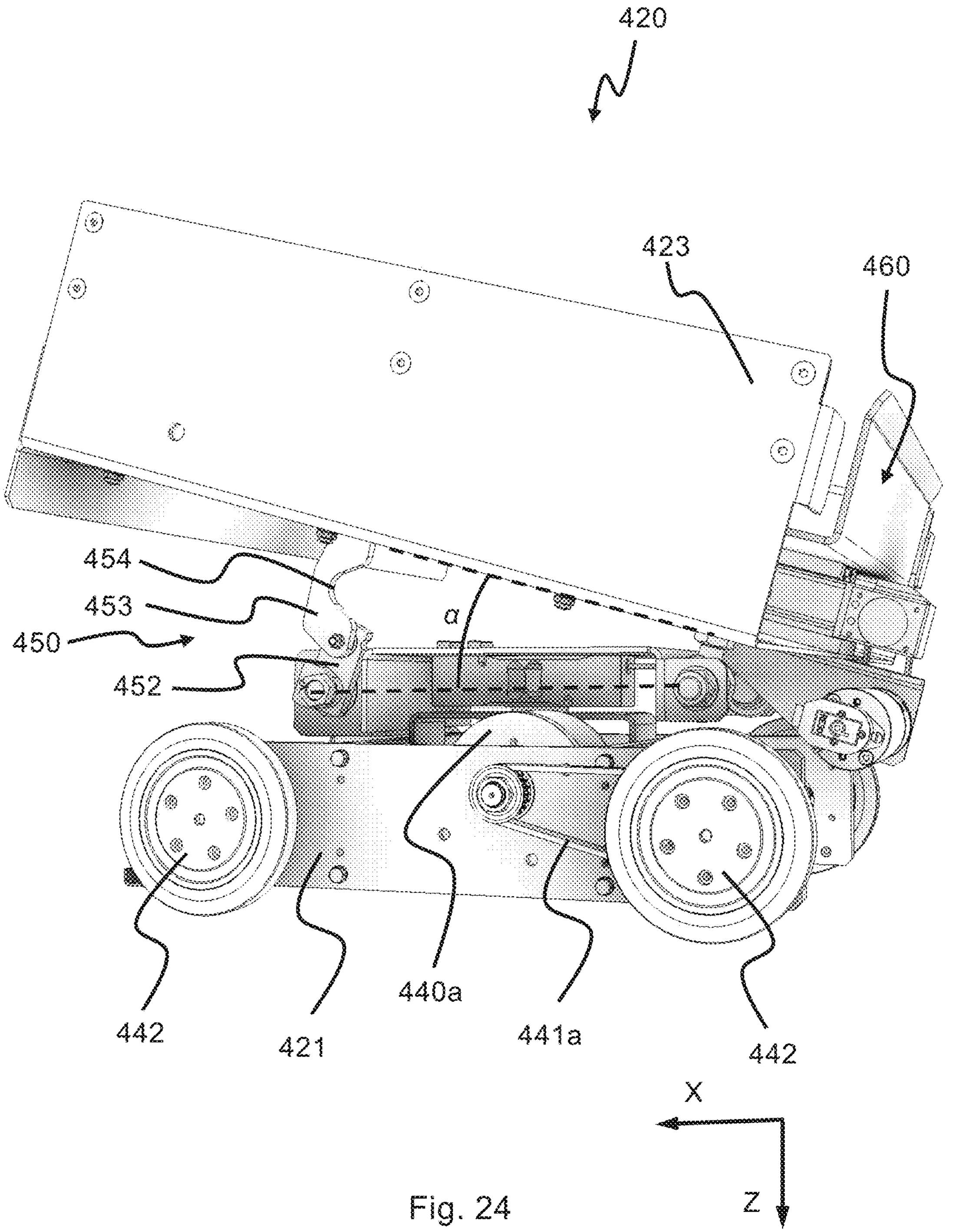
FIG. 24 is a side view of the primary carriage of FIG. 22 being tilted.

FIG. 22 and FIG. 23 show two perspective views of the primary carriage 420, and FIG. 24 shows a side view of the same primary carriage 420.

The primary carriage 420 is configured for transportation of the storage container 106. The primary carriage 420 comprises a primary carriage base 421 movable along the guiding frame 410; a primary carriage displacement motor 440*a* configured to move the primary carriage 420 along the guiding frame 410; and a first storage container support 422 connected to the primary carriage base 421.

The primary carriage base 421 may comprise at least two sets of wheels 442 connected to either side of the primary carriage base 421. The wheels 442 are configured to move along the guiding frame 410 and preferably along a guide path 411 provided in the guiding frame 410.

In FIG. 22 it is illustrated how one of the wheels 442 is connected to the primary carriage displacement motor 440*a* via a drive belt 441*a*. The primary carriage displacement motor 440*a* is in this example arranged at least partly within a volume defined by the primary carriage base 421. The primary carriage displacement motor 440*a* will typically be an electric motor powered by a battery or an external source (not illustrated). A battery will require less infrastructure, but will require charging from time to time, whereas an external power source will reduce the size and weight of the primary carriage 420.

The first storage container support 422 is connected to the primary carriage base 421, either as an integrated part of the primary carriage base 421 or as a separate unit. In the example of FIG. 22, the first storage container support 422 comprises rollers arranged on a plate 427 connected to the primary carriage base 421. The plate 427 may be considered a part of the primary carriage base 421, a part of the first storage container support 422, or an intermediate component between the two. Two rows of rollers are arranged along the first direction X with a gap 423 between them. The rollers are configured to support a storage container 106, and at the same time configured to facilitate transfer of the supported storage container 106 to the secondary carriage 430.

The first storage container support 422 may have a footprint that is larger than a footprint of the primary carriage base 421. The footprint of the first storage container support 422 is preferably substantially equal the area of the storage container $A_f$, such that the storage container 106 can be properly supported while keeping the size of footprint down.

As illustrated in FIG. 23, the primary carriage 420 may comprise vertical side panels 424 configured to prevent movement of the supported storage container 106 in the second direction Y. The vertical side panels 424 may be bent parts of the plate 427 on which the rollers are arranged. To reduce friction between the vertical side panels 424 and the storage container 106, the vertical side panels 425 may be provided with a sliding surface 425. The vertical side panels 424 and the sliding surfaces 425 will facilitate transfer of the supported storage container 106 to the secondary carriage 430.

The primary carriage 420 may comprise an end stop 426 configured to prevent movement of the supported storage container 106 in the first direction X beyond a given point. The end stops 426 may be bent parts of the plate 427 on which the rollers are arranged or bent parts of the vertical side panels 424.

The primary carriage 420 comprises a transfer device 460 for displacement of the storage container 106 from the primary carriage 420 to the secondary carriage 430. The transfer device 460 can be a conveyor integrated in the first storage container support 422, e.g. in the form of the rollers of the first storage container support 422 being powered to rotate. Alternatively, the conveyor may be a separate unit e.g. arranged on the plate 427 between the two rows of rollers forming the first storage container support 422, as illustrated in FIG. 22 and FIG. 23.

If the transfer device 460 is not integrated in the first storage container support 422, the transfer device 460 is preferably configured such that the storage container 106 can be placed on the first storage container support 422 without being obstructed by the transfer device 460.

The conveyor forming the transfer device 460 illustrated in FIG. 22 and FIG. 23 comprises a rail 462 projecting aft from the primary carriage 420; a slider 461 connected to the rail 462 and configured to interact with the storage container 106; and a transfer motor 462 configured to move the slider 461 relative to the first storage container support 422.

The rail 462 will project in the direction towards the secondary carriage 430. When the primary carriage 420 and the secondary carriage 430 are moved close together, the rail 462 should preferably project in to the second storage container support 432 of the secondary carriage 430. The rail 462 preferably has a length $L_r$ exceeding the length $L_f$ or width $W_f$ of the storage container 106, depending on the orientation of the storage container 106 relative to the rail 462.

In FIG. 22 and FIG. 23, the rail 462 is longer than the first storage container support 421. A first end of the rail 462 is arranged on the forward side of the first storage container support 422 and a second end of the rail 462 is arranged on the aft side of the first storage container support 422.

The rail 462 is preferably arranged such that a centre point of a storage container 106 supported on the first storage container support 422 is vertically aligned with the rail 462.

The slider 461 is connected to the rail 462 in a sliding manner, such that the slider 461 can be moved in the first direction X relative to the rail 462. In FIG. 23 it is illustrated that the slider has a vertical portion reaching a vertical elevation in which at least a part of the storage container 106 will be arranged when supported on the first storage container support 422. When the slider 461 is moved along the rail 462, the slider 461 will meet the storage container 106 when supported on the first storage container support 422.

In FIG. 23, the illustrated position of the slider 461 on the rail 462 can be considered an initial position of the slider 461. Moving the slider 461 from the initial position in the first direction X towards the aft of the primary carriage 420, will cause the storage container 106 supported on the first storage container support 422 to be displaced off the first storage container support 422 before the slider 461 reaches a subsequent position in the opposite end of the rail 462. If the secondary carriage 430 is moved sufficiently close to the primary carriage 420, the storage container 106 displaced off the first storage container support 422 will be transferred to the second storage container support 432.

The slider 461 illustrated in FIG. 23 will move in a reciprocating manner between the initial position and the subsequent position. Other types of sliders may move in a continuous path around the rail 461, i.e. moving from the initial position to the subsequent position along a top side of the rail 462 and from the subsequent position to the initial position along a bottom side of the rail 462.

The slider 461 may have a width extending in the second direction Y covering at least half the length $L_f$ or width $W_f$ of the storage container 106, depending on the orientation of the storage container 106 relative to the slider 461. The risk of rotating the storage container 106 during transfer is reduced with increased width of the slider 461.

The rail 462 may comprise a belt or a chain to which the slider 461 can be attached. Movement of the belt or chain will in turn move the slider 461.

The transfer motor 463 is configured to move the slider 461 along the rail 462 and through the slider 461 provide a thrust on the storage container 106 positioned on the first storage container support 422.

In FIG. 23, the transfer motor 463 is connected to the rail via a belt 464. The chain or belt arranged on the rail 462, and thus also the slider 461, can therefore be operated by means of the transfer motor 463.

In FIG. 23, the transfer motor 463 is arranged on a bracket mounted to the plate 427. Alternatively, the transfer motor 463 can be arranged on the primary carriage base 421. The transfer motor 462 will typically be an electric motor powered by a battery or an external source (not illustrated). A battery will require less infrastructure, whereas an external power source will reduce the size and weight of the primary carriage 420.

FIG. 22 shows that the primary carriage 420 may comprise a first coupling part 471. The first coupling part 471 is arranged on the primary carriage base 421. The first coupling part 471 is arranged on the aft side of the primary carriage 420, such that the first coupling part 471 can interact with the secondary carriage 430 when arranged in the access station 400, and in particular interact with a second coupling part 472 arranged on the secondary carriage 430.

The first coupling part 471 may be a sheet metal which has been bent or extruded to comprise a horizontal portion extending in the first direction X followed by a vertical portion extending in the third direction Z to form a retention lip. The first coupling part 471 may extend in the second direction Y the entire length of the primary carriage base 421 to provide a large interface towards the second coupling part 472.

FIG. 22 and FIG. 24 show that the primary carriage 420 may comprise a tilting device 450. The tilting device 450 may comprise a tilting motor 451, a drive crank 452, and a coupler link 453. The coupler link 453 may have a recess 454.

The tilting device 450 is configured to move the primary carriage 420 between a receiving state and a picking state. In the receiving state, the first storage container support 422 is arranged substantially parallel to the horizontal plane $P_H$, as illustrated inter alia in FIG. 10. In the picking state, the first storage container support 422 is tilted relative to the horizontal plane $P_H$ with a predetermined tilting angle α, as illustrated in FIG. 22, FIG. 23 and FIG. 24.

In FIG. 22, it is illustrated how the first storage container support 422 and the plate 427 may pivot around an axis of rotation $C_R$, in order to move between the receiving state and the picking state. The axis of rotation $C_R$ may preferably be arranged in a forward end of the primary carriage 420. In FIG. 22, the axis of rotation $C_R$ is arranged in the horizontal plane $P_H$ and oriented in the second direction Y.

The tilting motor 451 is arranged in the primary carriage base 421, preferably on the opposite side of the primary carriage 420 as the axis of rotation $C_R$, such that the tilting device 450 can provide a thrust on the first storage container support 422 and the plate 427 at a distance from the axis of rotation $C_R$. This thrust cause the first storage container support 422 and the plate 427 to rotate around the axis of rotation $C_R$.

The tilting motor 451 will typically be an electric motor powered by a battery or an external source (not illustrated). A battery will require less infrastructure, whereas an external power source will reduce the size and weight of the primary carriage 420.

The tilting motor 451 is configured to provide a torque. The drive crank 452 is coupled to the tilting motor 451 and configured to transmit torque from the tilting motor 451. The coupler link 453 may be pivotally coupled to the drive crank 452. The first storage container support 422 may be directly or indirectly (e.g. via the plate 427) pivotally coupled to the coupler link 453. The coupler link 453 may thus provide a direct or indirect thrust on the first storage container support 422 in response to torque from the tilting motor 451 via the drive crank 452.

Figure 25:
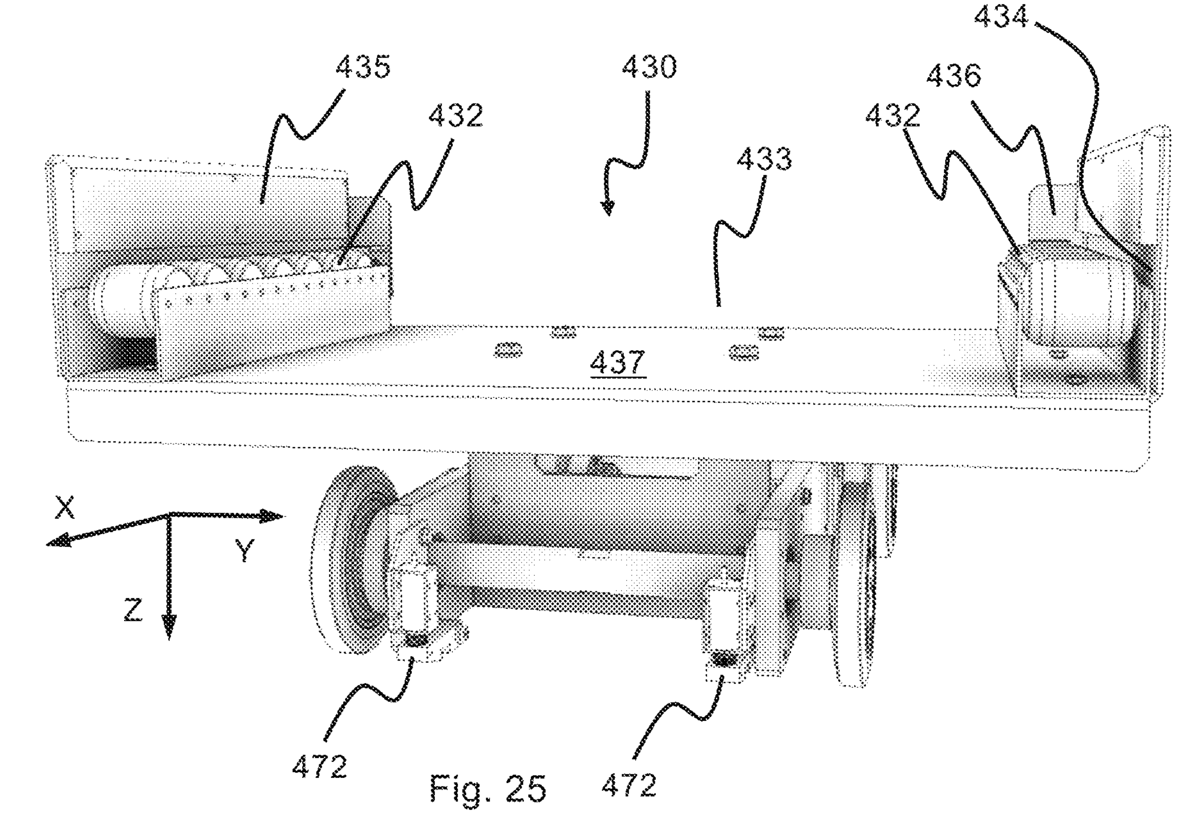
FIG. 25 is a front view of an exemplary embodiment of the secondary carriage comprising a secondary carriage base, a secondary carriage displacement motor, and a second storage container support.
Figure 26:
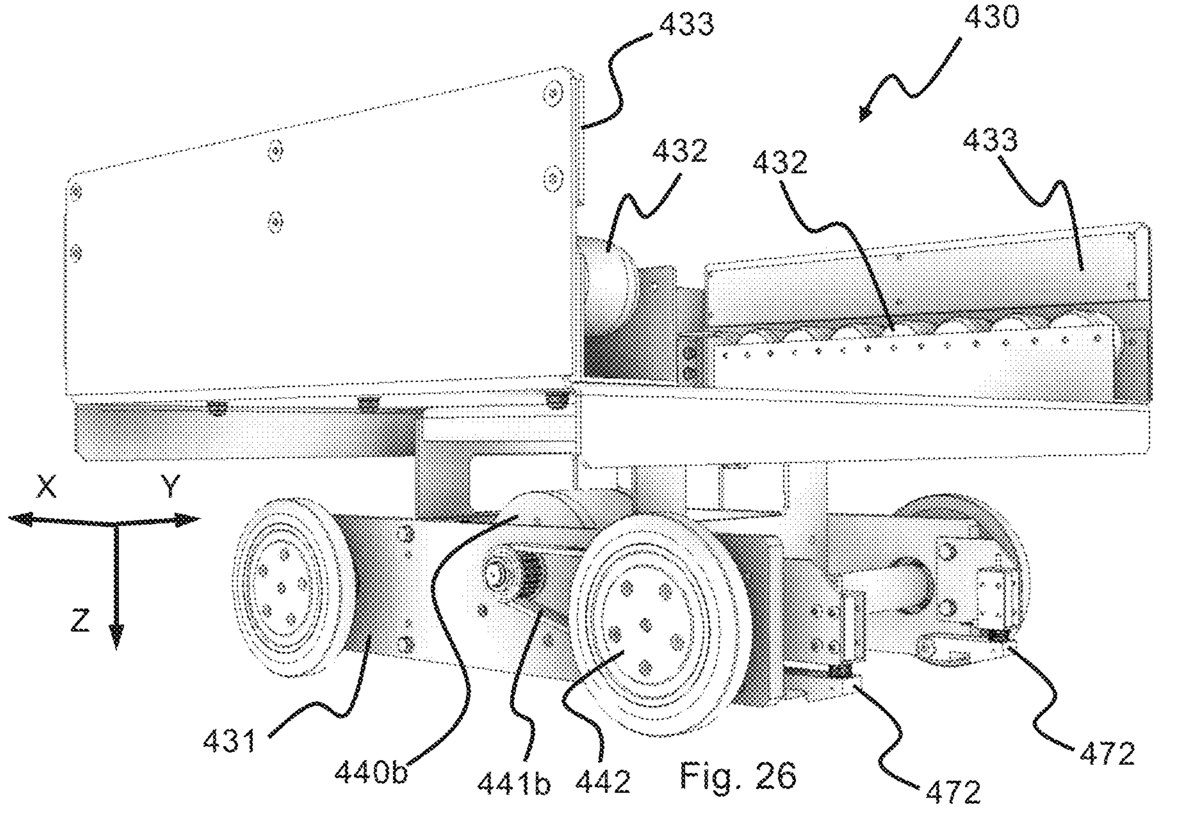
FIG. 26 is a perspective view of the secondary carriage of FIG. 25.

FIG. 25 shows a front view of the secondary carriage 430 and FIG. 26 is a perspective view of the same secondary carriage 430.

The secondary carriage 430 is configured for transportation of the storage container 106. The secondary carriage 430 comprises a secondary carriage base 431 movable along the guiding frame 410; a secondary carriage displacement motor **440*b* configured to move the secondary carriage 430 along the guiding frame 410; and a second storage container support 432 connected to the secondary carriage base 431**.

The secondary carriage base 431 may comprise at least two sets of wheels 442 connected to either side of the secondary carriage base 431. The wheels 442 are configured to move along the guiding frame 410 and preferably along a guide path 411 provided in the guiding frame 410.

In FIG. 26 it is illustrated how one of the wheels 442 is connected to the secondary carriage displacement motor **440*b* via a drive belt 441*b*. The secondary carriage displacement motor 440*b* is in this example arranged at least partly within a volume defined by the secondary carriage base 431. The secondary carriage displacement motor 440*b* will typically be an electric motor powered by a battery or an external source (not illustrated). A battery will require less infrastructure, but will require recharging from time to time, whereas an external power source will reduce the size and weight of the secondary carriage 430**.

The second storage container support 432 is connected to the secondary carriage base 431, either as an integrated part of the secondary carriage base 431 or as a separate unit. In the example of FIG. 25, the second storage container support 432 comprises rollers arranged on a plate 437 connected to the secondary carriage base 431. The plate 437 may be considered a part of the secondary carriage base 431, a part of the second storage container support 432, or an intermediate component between the two. Two rows of rollers are arranged along the first direction X with a gap 433 between them. The rollers are configured to support a storage container 106, and at the same time configured to facilitate receipt of the storage container 106 transferred from the primary carriage 420.

The second storage container support 432 may have a footprint that is larger than a footprint of the secondary carriage base 431. The footprint of the second storage container support 432 is preferably substantially equal the area of the storage container $A_f$, such that the storage container 106 can be properly supported while keeping the size of footprint down.

As illustrated in FIG. 25, the secondary carriage 430 may comprise vertical side panels 434 configured to prevent movement of the supported storage container 106 in the second direction Y. The vertical side panels 434 may be bent parts of the plate 437 on which the rollers are arranged. To reduce friction between the vertical side panels 434 and the storage container 106, the vertical side panels 435 may be provided with a sliding surface 435. The vertical side panels 434 and the sliding surfaces 435 will facilitate receipt of the storage container 106 transferred from the primary carriage 420.

The secondary carriage 430 may comprise an end stop 436 configured to prevent movement of the supported storage container 106 in the first direction X beyond a given point. The end stops 436 may be bent parts of the plate 437 on which the rollers are arranged or bent parts of the vertical side panels 434.

The secondary carriage 430 may comprise one or several second coupling parts 472. In the example of FIG. 25 and FIG. 26 the secondary carriage 430 comprises two second coupling parts 472. These second coupling parts 472 are arranged on the secondary carriage base 431 and spaced apart in the second direction Y. In this example with one first coupling part 471, the distance between the second coupling parts 472 should not exceed the extent of the first coupling part 471 in the second direction Y. The second coupling parts 472 are arranged on the forward side of the secondary carriage 430, such that the second coupling parts 472 can interact with the primary carriage 420 when arranged in the access station 400, and in particular interact with the primary coupling part 471 arranged on the primary carriage 420.

The second coupling parts 472 may have a profile configured to latch with the retention lip of the first coupling part 471, such that relative horizontal movement in the first direction X is prevented.

The profile of the second coupling part 472 may be resilient or biased to a given position, such that the first coupling part 471 and the second coupling part 472 can snap into connection when forced together. FIG. 26 show that the profile can be pivotably connected to the secondary carriage base 431 and biased downwards by a spring. The profile may also be connected to a mechanism configured to pull the profile upwards, such that the first coupling part 471 and the second coupling part 472 can be connected and disconnected.

The profile of the second coupling part 472 may be chamfered to provide a vertical force vector on the profile in response to the first coupling part 471 and the second coupling part 472 being forced together in the horizontal direction. The biasing force should then be lower than the expected vertical force vector.

Figure 27A:
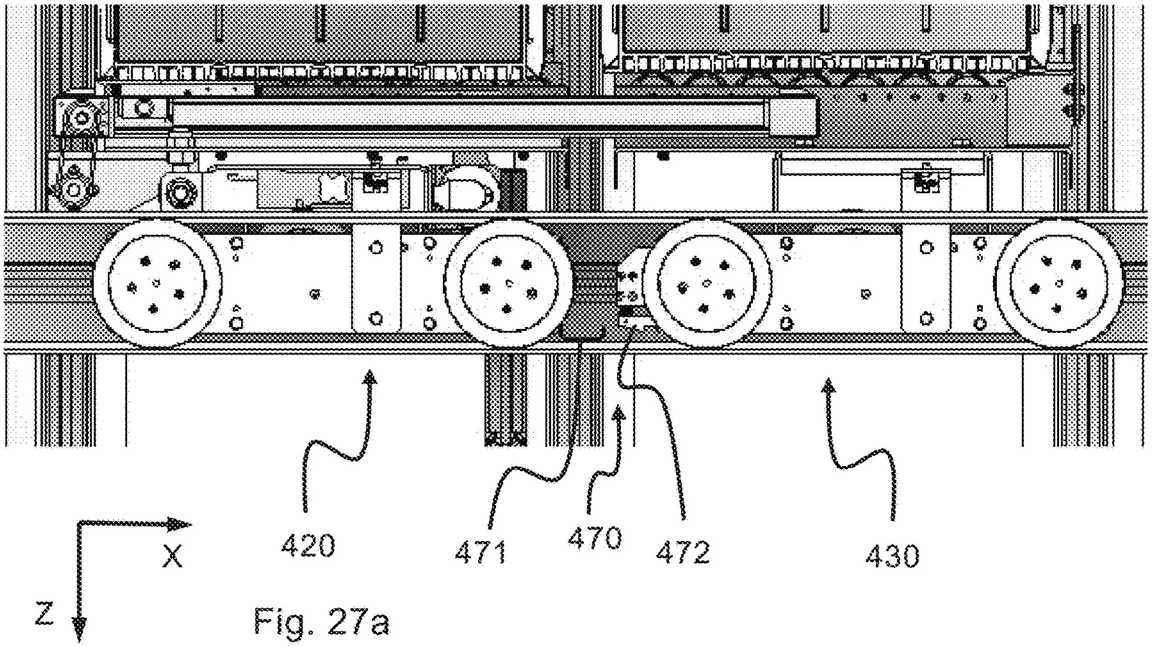
FIG. 27*a* is a side view of the latch in a disconnected state.
Figure 27B:
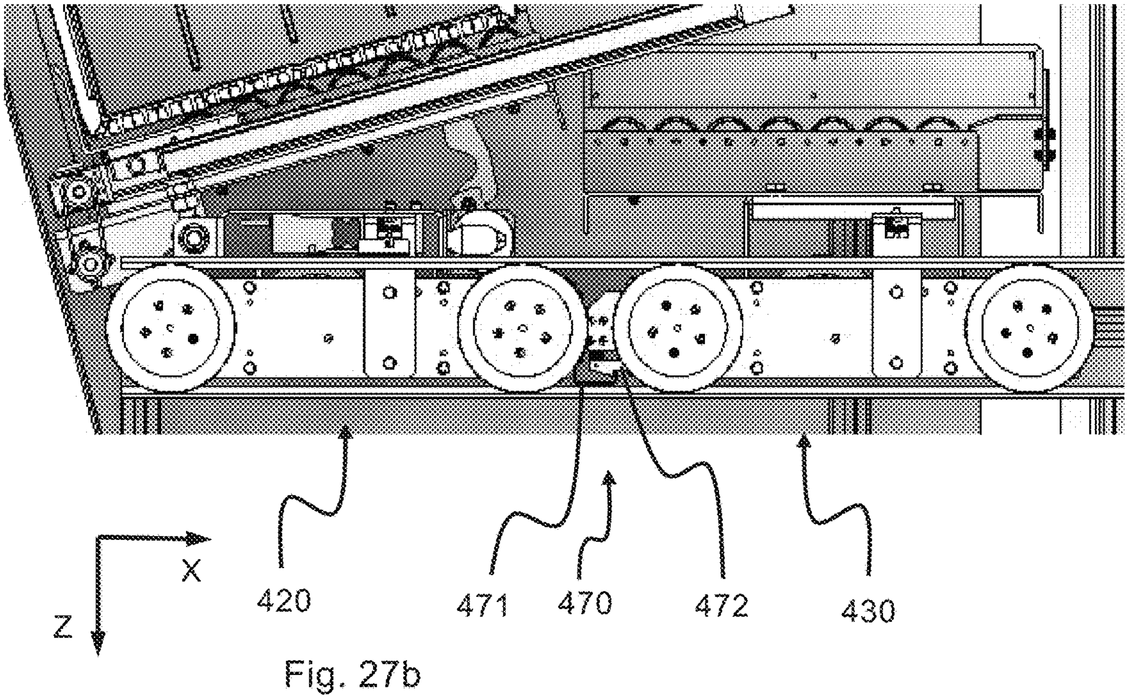
FIG. 27*b* is a side view of the latch in a connected state.

The latch 470 is illustrated in a disconnected state in FIG. 27*a* and a connected state in FIG. 27*b*.

Figure 28:
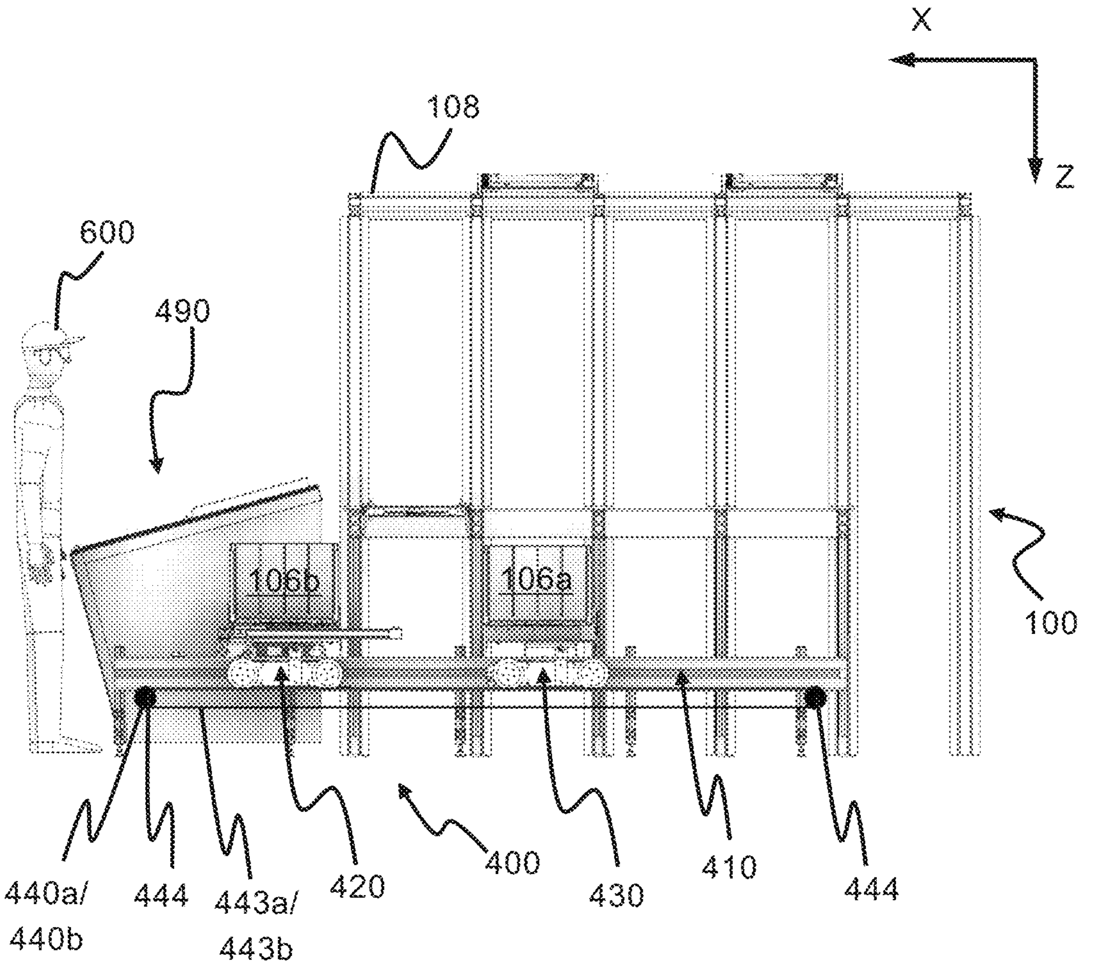
FIG. 28 is a vertical cross-section of the access station of FIG. 9, in which the primary carriage is moved along the guiding frame by means of a primary drive belt and the secondary carriage is moved along the guiding frame by means of a secondary drive belt.

FIG. 28 shows a vertical cross-section of the access station 400. FIG. 28 illustrates an alternative configuration of how the primary carriage 420 and the secondary carriage 430 may be moved along the guiding frame 410.

The primary carriage 420 may comprise a primary drive belt 443*a* arranged on the guiding frame 410, e.g. by means of belt wheels 444 arranged at opposite ends of the guiding frame 410 or at least such arranged that the primary drive belt 443*a* extends from the picking position $P_P$ to the receiving area $A_R$. The primary drive belt 443*a* is typically connected to the primary carriage base 421. The primary carriage displacement motor 440*a* may be arranged on the guiding frame 410 and configured to operate the primary drive belt 443*a* to move the primary carriage 420 along the guiding frame 410, e.g. by being connected to one of the belt wheels 444.

The secondary carriage 430 may comprise a secondary drive belt 443*b* arranged on the guiding frame 410, e.g. by means of belt wheels 444 arranged at opposite ends of the guiding frame 410 or at least such arranged that the secondary drive belt 443*b* extends from the picking position $P_P$ to the receiving area $A_R$. The secondary drive belt 443*b* is typically connected to the secondary carriage base 431. The secondary carriage displacement motor 440*b* may be arranged on the guiding frame 410 and configured to operate the secondary drive belt 443*b* to move the secondary carriage 430 along the guiding frame 410, e.g. by being connected to one of the belt wheels 444. The secondary drive belt 443*b* can thus be operated independently of the primary drive belt 443*a*, and vice versa.

The primary drive belt 443*a* and the secondary drive belt 443*b* may be arranged in parallel with the same vertical elevation either side-by-side or spaced apart.

In the configuration of FIG. 28, additional motors are not required to rotate the wheels. As an alternative to connecting the primary drive belt 443*a* to the primary carriage base 421, a plurality of belt wheels 444 may be arranged on the primary carriage base 421 configured to receive the primary drive belt 443*a*. To operate the primary drive belt 443*a* in this configuration, the primary carriage displacement motor 440*a* can be arranged on the primary carriage base 421 and connected to one of the belt wheels 444 of the primary carriage base 421.

As an alternative to connecting the secondary drive belt 443*b* to the secondary carriage base 431, a plurality of belt wheels 444 may be arranged on the secondary carriage base 431 configured to receive the secondary drive belt 443*b*. To operate the secondary drive belt 443*b* in this configuration, the secondary carriage displacement motor 440*b* can be arranged on the secondary carriage base 431 and connected to one of the belt wheels 444 of the secondary carriage base 431.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
80 Product item
100 Framework structure
102 Upright members of framework structure
103 Horizontal members of framework structure
104 Storage grid
105 Storage column
106 Storage container
106*a* First storage container
106*b* Second storage container

106*c* Third storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
11*a* First rail of second direction (Y)
111*b* Second rail of second direction (Y)
112 Access opening
119 First port column
120 Second port column
121 Third port column
122 Fourth port column
201 Prior art container handling vehicle
201*a* Vehicle body of the storage container vehicle 201
201*b* Drive means/wheel arrangement, first direction (X)
201*c* Drive means/wheel arrangement, second direction (Y)
301 Prior art cantilever container handling vehicle
301*a* Vehicle body of the container handling vehicle 301
301*b* Drive means in first direction (X)
301*c* Drive means in second direction (Y)
304 Gripping device
400 Access station
410 Guiding frame
411 Guide path
420 Primary carriage
421 Primary carriage base
422 First storage container support
423 Gap in first storage container support
424 Vertical side panel, for first storage container
425 Sliding surface, for vertical panel
426 End stop, for first storage container support
427 Plate, of primary carriage
430 Secondary carriage
431 Secondary carriage base
432 Second storage container support
433 Gap in second storage container support
434 Vertical side panel, for second storage container
435 Sliding surface, for vertical panel
436 End stop, for second storage container support
437 Plate, of secondary carriage
440*a* Primary carriage displacement motor
440*b* Secondary carriage displacement motor
441*a* Drive belt, for the primary carriage displacement motor
441*b* Drive belt, for the secondary carriage displacement motor
442 Wheel, for carriage
443*a* Primary drive belt, for the primary carriage
443*b* Secondary drive belt, for the secondary carriage
444 Belt wheel
450 Tilting device
451 Tilting motor
452 Drive crank, for tilting device
453 Coupler link, for tilting device
454 Recess in coupler link
460 Transfer device
461 Slider, of the transfer device
462 Rail, of the transfer device
463 Transfer motor, of the transfer device
464 Drive belt, for the transfer motor
470 Latch
471 First coupling part, of latch
472 Second coupling part, of latch

490 Access cabinet, with hatch
500 Control system
600 Picker
X First direction
Y Second direction
Z Third direction
$P_H$ Horizontal plane
Lr Length of rail
Wf Width of storage container
Lf Length of storage container
Hf Height of storage container
Af Area of storage container
$P_P$ Picking position
$A_P$ Picking area
$A_R$ Receiving area
$P_R$, $P_{R1+n}$ Receiving position (first, second, third, etc.)
α Tilting angle
$C_R$ Axis of rotation

The invention claimed is:

1. An access station for presentation of a storage container from an automated storage and retrieval system to a picker, the access station having a receiving area for receiving storage containers, and a picking position for picking products from a storage container, wherein the access station comprises:

- a guiding frame arranged in a horizontal plane and extending between the picking position and the receiving area;
- a primary carriage for transporting a storage container, wherein the primary carriage comprises:
  - a primary carriage base movable along the guiding frame;
  - a primary carriage displacement motor configured to move the primary carriage along the guiding frame;
  - a first storage container support connected to the primary carriage base; and
  - a transfer device for displacement of a storage container positioned on the first storage container support;
- a secondary carriage for transporting a storage container, wherein the secondary carriage comprises:
  - a secondary carriage base movable along the guiding frame;
  - a secondary carriage displacement motor configured to move the secondary carriage along the guiding frame;
  - a second storage container support connected to the secondary carriage base;

wherein the secondary carriage is configured to receive a storage container being displaced from the primary carriage by the transfer device wherein the transfer device comprises a conveyor; and wherein the conveyor comprises:

- a rail projecting aft from the primary carriage in a direction towards the secondary carriage, the rail having a length exceeding the length or width of the storage container;
- a slider connected to the rail and configured for interaction with a storage container; and
- a transfer motor configured to move the slider relative to the first storage container support in the direction towards the secondary carriage, to provide a thrust on a storage container positioned on the first storage container support.

2. The access station according to claim 1, wherein the receiving area comprises a plurality of receiving positions.

3. The access station according to claim 1, wherein the primary carriage and the secondary carriage are configured to move independently of each other.

4. The access station according to claim 1, wherein the access station further comprises:

a latch for releasably connecting the primary carriage to the secondary carriage.

5. The access station according to claim 4, wherein the latch comprises:

a first coupling part arranged at a rear end of the primary carriage base; and a second coupling part arranged at a front end of the secondary carriage base;

wherein the rear end of the primary carriage is facing the front end of the secondary carriage.

6. The access station according to claim 1, wherein the first storage container support and the second storage container support comprise rollers, sliding surface, a continuous track or any combinations thereof.

7. The access station according to claim 1, wherein the guide frame comprises a first guide path; and wherein both the primary carriage and the secondary carriage are configured for movement along the first guide path.

8. The access station according to claim 1, wherein the primary carriage further comprises:

at least two sets of wheels connected to either side of the primary carriage base; and wherein the secondary carriage further comprises:

at least two sets of wheels connected to either side of the secondary carriage base.

9. The access station according to claim 8, wherein the primary carriage displacement motor is arranged on the primary carriage base and configured to turn at least one of the wheels connected to the primary carriage base; and wherein the secondary carriage displacement motor is arranged on the secondary carriage base and configured to turn at least one of the wheels connected to the secondary carriage base.

10. The access station according to claim 1, wherein the primary carriage further comprises:

a primary drive belt arranged on the guiding frame, the primary drive belt extending at least from the picking position to the receiving area and being connected to the primary carriage base;

wherein the primary carriage displacement motor is arranged on the guiding frame and configured to operate the primary drive belt to move the primary carriage along the guiding frame; and wherein the secondary carriage further comprises:

a secondary drive belt arranged on the guiding frame, the secondary drive belt extending at least from the picking position to the receiving area and being connected to the secondary carriage base;

wherein the secondary carriage displacement motor is arranged on the guiding frame and configured to operate the secondary drive belt to move the secondary carriage along the guiding frame.

11. The access station according to claim 1, wherein the first storage container support is pivotably connected to the primary carriage base by a pivotal connection;

wherein the access station further comprises:

a tilting device for tilting of the first storage container support; and wherein the primary carriage has a receiving state in which the first storage container support is arranged substantially parallel to the horizontal plane, and a picking state in which the first storage container support is tilted relative to the horizontal plane with a predetermined tilting angle.

12. The access station according to claim 11, wherein the tilting device comprises:

a tilting motor arranged on the primary carriage base for providing rotational drive;

a drive crank coupled to the tilting motor to transmit torque from the tilting motor; and a coupler link pivotally coupled to the drive crank at a first end, and pivotally coupled to the first storage container support at an opposite second end, wherein the coupler link, in response to operation of the tilting motor, is configured to provide a thrust to an underside of the first storage container support, such that the first storage container support is tilted relative to the horizontal plane.

13. A primary carriage for transporting a storage container in an access station, the access station having a receiving area for receiving storage containers, and a picking position for picking products from a storage container, wherein the access station comprises:

a guiding frame arranged in a horizontal plane and extending between the picking position and the receiving area;

wherein the primary carriage comprises:

a primary carriage base movable along the guiding frame;

at least two sets of wheels connected to either side of the primary carriage base;

a primary carriage displacement motor configured to move the primary carriage along the guiding frame;

a first storage container support connected to the primary carriage base; and a transfer device for displacement of a storage container positioned on the first storage container support;

wherein the transfer device comprises a conveyor; and wherein the conveyor comprises:

a rail projecting aft from the primary carriage in a direction towards a secondary carriage, the rail having a length exceeding the length or width of the storage container;

a slider connected to the rail and configured for interaction with a storage container; and a transfer motor configured to move the slider relative to the first storage container support in the direction towards the secondary carriage, to provide a thrust on a storage container positioned on the first storage container support.

14. The primary carriage according to claim 13, wherein the first storage container support is pivotably connected to the primary carriage base by a pivotal connection;

wherein the primary carriage further comprises:

a tilting device for tilting of the first storage container support; and wherein the primary carriage has a receiving state in which the first storage container support is arranged substantially parallel to the horizontal plane, and a picking state in which the first storage container support is tilted relative to the horizontal plane with a predetermined tilting angle.

15. The primary carriage according to claim 13, wherein the primary carriage further comprises:

a first coupling part releasably connectable to a second coupling part of a secondary carriage.

16. The primary carriage according to claim 13, wherein the primary carriage displacement motor is configured to move the primary carriage along the guiding frame by turning at least one of the wheels.

17. The primary carriage according to claim 13, wherein the secondary carriage comprises:

a secondary carriage base movable along the guiding frame;

a secondary carriage displacement motor configured to move the secondary carriage along the guiding frame; and a second storage container support connected to the secondary carriage base;

wherein the secondary carriage is configured to receive a storage container being displaced from the primary carriage by the transfer device.

18. An automated storage and retrieval system comprising:

an access station for presentation of a storage container from an automated storage and retrieval system to a picker, the access station having a receiving area for receiving storage containers, and a picking position for picking products from a storage container, wherein the access station comprises:

a guiding frame arranged in a horizontal plane and extending between the picking position and the receiving area;

a primary carriage for transporting a storage container, wherein the primary carriage comprises:

a primary carriage base movable along the guiding frame;

a primary carriage displacement motor configured to move the primary carriage along the guiding frame;

a first storage container support connected to the primary carriage base; and a transfer device for displacement of a storage container positioned on the first storage container support;

a secondary carriage for transporting a storage container, wherein the secondary carriage comprises:

a secondary carriage base movable along the guiding frame;

a secondary carriage displacement motor configured to move the secondary carriage along the guiding frame; and a second storage container support connected to the secondary carriage base;

wherein the secondary carriage is configured to receive a storage container being displaced from the primary carriage by the transfer device;

a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid pattern in the horizontal plane comprising a plurality of adjacent access openings defined by a pair of neighbouring rails of the first set of rails and a pair of neighbouring rails of the second set of rails;

a plurality of stacks of storage containers arranged in storage columns located beneath a storage section of the rail system, wherein each storage column is located vertically below an access opening;

at least one port column located beneath a delivery section of the rail system and vertically aligned with a receiving position of the access station, the at least one port column being void of storage containers;

a container handling vehicle comprising a lifting device for lifting storage containers stacked in the stacks above the storage section and drive means configured to drive the vehicle along the rail system in at least one of the first direction and the second direction;

wherein the transfer device comprises a conveyor; and wherein the conveyor comprises:

a rail projecting aft from the primary carriage in a direction towards the secondary carriage, the rail having a length exceeding the length or width of the storage container;

a slider connected to the rail and configured for interaction with a storage container; and a transfer motor configured to move the slider relative to the first storage container support in the direction towards the secondary carriage, to provide a thrust on a storage container positioned on the first storage container support.

19. The automated storage and retrieval system according to claim 18, wherein the automated storage and retrieval system comprises:

at least two port columns.

20. The automated storage and retrieval system according to claim 18, wherein the automated storage and retrieval system comprises:

at least two access stations arranged side-by-side.

21. A method of presenting a storage container at an access station and returning the storage container using an automated storage and retrieval system comprising:

an access station for presentation of a storage container from an automated storage and retrieval system to a picker, the access station having a receiving area for receiving storage containers, and a picking position for picking products from a storage container, wherein the access station comprises:

a guiding frame arranged in a horizontal plane and extending between the picking position and the receiving area;

a primary carriage for transporting a storage container, wherein the primary carriage comprises:

a primary carriage base movable along the guiding frame;

a primary carriage displacement motor configured to move the primary carriage along the guiding frame;

a first storage container support connected to the primary carriage base; and a transfer device for displacement of a storage container positioned on the first storage container support;

a secondary carriage for transporting a storage container, wherein the secondary carriage comprises:

a secondary carriage base movable along the guiding frame;

a secondary carriage displacement motor configured to move the secondary carriage along the guiding frame; and a second storage container support connected to the secondary carriage base;

wherein the secondary carriage is configured to receive a storage container being displaced from the primary carriage by the transfer device;

a rail system comprising a first set of parallel rails arranged in a horizontal plane and extending in a first direction and a second set of parallel rails arranged in the horizontal plane and extending in a second direction which is orthogonal to the first direction, which first and second sets of rails form a grid pattern in the horizontal plane comprising a plurality of adjacent access openings defined by a pair of neighbouring rails of the first set of rails and a pair of neighbouring rails of the second set of rails;

a plurality of stacks of storage containers arranged in storage columns located beneath a storage section of the rail system, wherein each storage column is located vertically below an access opening;

at least one port column located beneath a delivery section of the rail system and vertically aligned with a receiving position of the access station, the at least one port column being void of storage containers; and a container handling vehicle comprising a lifting device for lifting storage containers stacked in the stacks above the storage section and drive means configured to drive the vehicle along the rail system in at least one of the first direction and the second direction, wherein the method comprises:

placing a first storage container on the first storage container support;

moving the primary carriage to the picking position to present the first storage container to a picker;

moving the primary carriage and the secondary carriage into contact with each other by the primary carriage displacement motor and the secondary carriage displacement motor respectively;

transferring the first storage container from the first storage container support to the second storage container support by the transfer device wherein the transfer device comprises a conveyor; and wherein the conveyor comprises:

a rail projecting aft from the primary carriage in a direction towards the secondary carriage, the rail having a length exceeding the length or width of the storage container;

a slider connected to the rail and configured for interaction with a storage container; and a transfer motor configured to move the slider relative to the first storage container support in the direction towards the secondary carriage, to provide a thrust on a storage container positioned on the first storage container support.

22. The method according to claim 21, wherein, if the primary carriage and the secondary carriage are not already in the receiving area, the method further comprises:

moving the primary carriage and the secondary carriage along the guiding frame to the receiving area, while transferring the storage container.

23. The method according to claim 21, wherein the method further comprises:

moving the primary carriage to a first receiving position;

placing a second storage container on the first storage container support by a first container handling vehicle; and moving the primary carriage to the picking position to present the second storage container to the picker.

24. The method according to claim 23, wherein the method further comprises:

moving the secondary carriage to the first receiving position;

retrieving the first storage container from the second storage container support by the first container handling vehicle.

25. The method according to claim 24, wherein the method further comprises:

supplying the second storage container to the first storage container support through a first port column by a first cantilever container handling vehicle facing in a first direction; and retrieving the first storage container from the second storage container support through a second port column by a second cantilever container handling vehicle facing in a second direction which is opposite to the first direction.

26. The method according to claim 21, wherein the access station comprises a latch for releasably connecting the primary carriage to the secondary carriage, wherein the method further comprises:

before transferring the first storage container, connect the primary carriage to the secondary carriage by the latch;

after transferring the first storage container, release the primary carriage from the secondary carriage by the latch.

* * * * *